US008553301B2

(12) United States Patent
Tamura

(10) Patent No.: US 8,553,301 B2
(45) Date of Patent: Oct. 8, 2013

(54) IMAGE PROCESSING APPARATUS, METHOD, AND PROGRAM PRODUCT TO PERFORM COLOR-REDUCTION PROCESSING FOR A BLOCK

(75) Inventor: Hirokazu Tamura, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 13/255,238

(22) PCT Filed: Mar. 9, 2011

(86) PCT No.: PCT/JP2011/056133
§ 371 (c)(1),
(2), (4) Date: Sep. 7, 2011

(87) PCT Pub. No.: WO2011/125433
PCT Pub. Date: Oct. 13, 2011

(65) Prior Publication Data
US 2012/0262738 A1    Oct. 18, 2012

(30) Foreign Application Priority Data
Apr. 8, 2010  (JP) .................................. 2010-089855

(51) Int. Cl.
*H04N 1/60* (2006.01)
*H04N 1/64* (2006.01)

(52) U.S. Cl.
CPC ............. *H04N 1/6058* (2013.01); *H04N 1/644* (2013.01)
USPC ............ 358/518; 358/530; 358/539; 382/162

(58) Field of Classification Search
CPC ............................................. H04N 1/00–1/648
USPC ............... 358/1.9, 1.13, 1.15, 1.18, 518, 530, 358/537–539; 382/162, 166, 167
See application file for complete search history.

(56) References Cited

U.S. PATENT DOCUMENTS 5,625,759 A *  4/1997  Freeman ....................... 358/539
6,243,416 B1   6/2001  Matsushiro et al. .......... 375/240

(Continued)

FOREIGN PATENT DOCUMENTS

JP    10-257488      9/1998
JP    2004-104621    4/2004

(Continued)

OTHER PUBLICATIONS

U.S. Appl. No. 13/197,634, filed Aug. 3, 2011 by Hiroki Takeishi.

(Continued)

*Primary Examiner* — Scott A Rogers
(74) *Attorney, Agent, or Firm* — Fitzpatrick, Cella, Harper & Scinto

(57) ABSTRACT

An image processing apparatus comprises: means for performing color-reduction processing for a block; means for comparing color data of respective pixels in the block, thereby specifying a placement pattern of the color data included in the block; means for extracting, as first color data, color data corresponding to a pixel at a predefined position in the block, and further extracting color data other than the first color data included in the block; means for outputting the placement pattern specified, and the first color data and the color data other than the first color data, which are extracted; and means for controlling to execute color-reduction processing, for second image data formed from the first color data output, upon determining blocks each including a predetermined number of pixels as blocks to be processed, thereby further controlling to re-execute, for the block having undergone the color-reduction processing, processing by each means.

16 Claims, 22 Drawing Sheets

(56) References Cited

U.S. PATENT DOCUMENTS

| | | | |
|---|---|---|---|
| 6,373,890 B1 * | 4/2002 | Freeman | 358/539 |
| 6,750,867 B1 | 6/2004 | Gibson | |
| 7,236,636 B2 | 6/2007 | Sakai et al. | |
| 7,652,800 B2 | 1/2010 | Shoda et al. | |
| 8,331,705 B2 * | 12/2012 | Shiraishi et al. | 382/238 |
| 8,452,085 B2 * | 5/2013 | Itoh | 382/167 |
| 2008/0100624 A1 | 5/2008 | Matsunaga | 345/469.1 |
| 2008/0259359 A1 | 10/2008 | Tamura | 358/1.1 |
| 2008/0273212 A1 | 11/2008 | Takeishi | 358/1.9 |
| 2009/0097072 A1 | 4/2009 | Tamura | 358/3.01 |
| 2009/0323132 A1 | 12/2009 | Yano et al. | 358/466 |
| 2010/0067790 A1 | 3/2010 | Yamamoto | 382/166 |
| 2010/0128295 A1 | 5/2010 | Tamura | 358/1.12 |
| 2011/0109942 A1 | 5/2011 | Kashibuchi et al. | 358/3.13 |
| 2011/0188750 A1 * | 8/2011 | Tamura | 382/167 |
| 2011/0222082 A1 * | 9/2011 | Tomi | 358/1.9 |
| 2012/0014597 A1 * | 1/2012 | Matsunaga | 382/166 |
| 2012/0050763 A1 * | 3/2012 | Takeishi | 358/1.9 |

FOREIGN PATENT DOCUMENTS

| | | |
|---|---|---|
| JP | 2008-271046 | 11/2008 |
| JP | 2010-74406 | 4/2010 |
| JP | 2011-71767 | 4/2011 |

OTHER PUBLICATIONS

U.S. Appl. No. 13/177,464, filed Jul. 6, 2011 by Daisuke Matsunaga.

* cited by examiner

FIG. 3
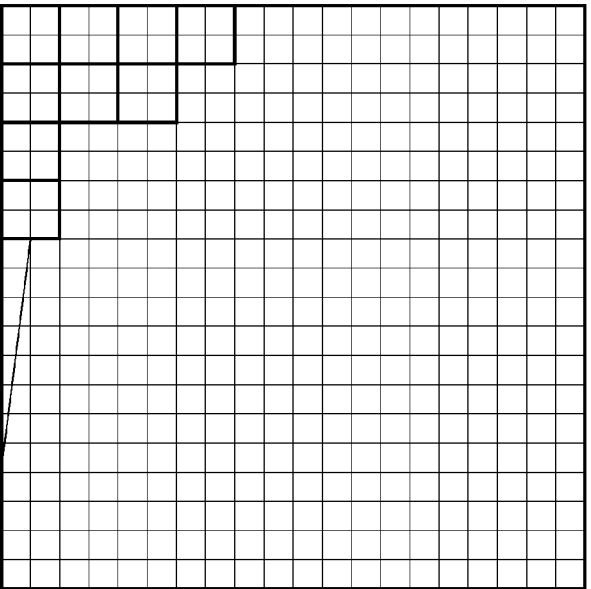
IMAGE
| | |
|---|---|
|  | SAME COLOR FOR ALL PIXELS : ONE PATTERN |
| 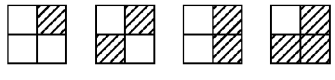 | TWO COLORS: SEVEN PATTERNS |
| 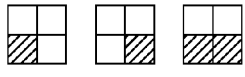 | THREE COLORS: SIX PATTERNS |
|  | DIFFERENT COLORS FOR ALL PIXELS: ONE PATTERN |

FIG. 4

| | 1-2 | 1-3 | 1-4 | 2-3 | 2-4 | 3-4 | |
|---|---|---|---|---|---|---|---|
| | bit 0 | bit 1 | bit 2 | bit 3 | bit 4 | bit 5 | |
| IMAGE | COMPARISON RESULT | | | | | | PATTERN FLAG |
| | 1 | 1 | 1 | 1 | 1 | 1 | 0 |
| | 0 | 1 | 1 | 0 | 0 | 1 | 1 |
| | 0 | 0 | 1 | 1 | 0 | 0 | 2 |
| | 0 | 1 | 0 | 0 | 1 | 0 | 3 |
| | 0 | 0 | 0 | 1 | 1 | 1 | 4 |
| | 1 | 0 | 1 | 0 | 1 | 0 | 5 |
| | 1 | 1 | 0 | 1 | 0 | 0 | 6 |
| | 1 | 0 | 0 | 0 | 0 | 1 | 7 |
| | 0 | 1 | 0 | 0 | 0 | 0 | 8 |
| | 0 | 0 | 1 | 0 | 0 | 0 | 9 |
| | 0 | 0 | 0 | 0 | 0 | 1 | A |
| | 0 | 0 | 0 | 1 | 0 | 0 | B |
| | 0 | 0 | 0 | 0 | 1 | 0 | C |
| | 1 | 0 | 0 | 0 | 0 | 0 | D |
| | 0 | 0 | 0 | 0 | 0 | 0 | E |

F I G. 12
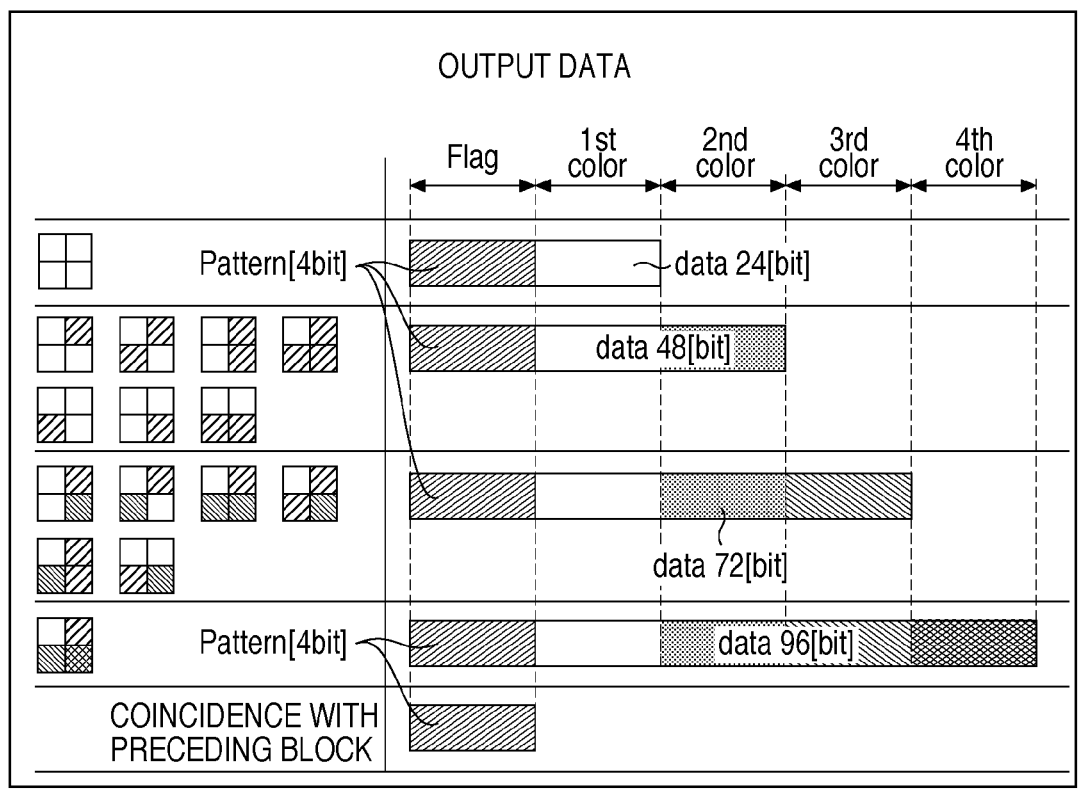

FIG. 18

| COORDINATE POSITION (X, Y) | PACKET SIZE (Byte) |
|---|---|
| (0, 0) | 32 |
| (1, 0) | 48 |
| (2, 0) | 36 |
| (3, 0) | 128 |
| ⋮ | ⋮ |
| (X, Y) | 36 |

IMAGE PROCESSING APPARATUS, METHOD, AND PROGRAM PRODUCT TO PERFORM COLOR-REDUCTION PROCESSING FOR A BLOCK

TECHNICAL FIELD

The present invention relates to a technique that compresses an image for each predetermined block, and that of performing image processing and restoration processing for the image compressed for each block.

BACKGROUND ART

Conventionally, to save the space on a memory/hard disk and to shorten the time taken to write data on it, not only a digital multifunctional peripheral but also image processing apparatuses such as a digital camera and a facsimile apparatus compress color image data, which allows for reduction in cost and a gain in speed. A JPEG scheme that uses discrete cosine transformation and a scheme that uses wavelet transformation are widely employed as color still image compression schemes. Encoding schemes of these kinds generally encode an image for each predetermined block (for example, for each unit of 8×8 or 16×16 pixels), and perform discrete cosine transformation, quantization, and entropy coding, thereby achieving high compression efficiency. In these schemes, variable-length coding for each block is adopted, so random access for referring to a small area is difficult. In this access, the code length is indeterminate depending on the type of image, so the position (memory address) of a block to be decoded is also indeterminate. This makes it necessary not only to determine this position in some way but also to perform decoding processing for each block. Also, discrete cosine transformation by JPEG normally requires 8×8 pixels as the block size. To perform discrete cosine transformation which uses this block unit at high speed, not only a high-speed arithmetic unit and dedicated hardware but also a buffer memory is necessary. An image compression technique (for example, Japanese Patent Laid-Open No. 2004-104621) which uses a small block size and a fixed compression ratio has been disclosed as an approach to solving these problems associated with the random access performance and the complexity of processing.

Also, with an increase in resolution, the number of pixels which require image processing is dramatically increasing, so the processing load is getting heavier. When the above-mentioned image compression is employed, processing of decoding compressed data becomes necessary to refer to and convert the pixel data having undergone this image compression. In other words, image processing cannot be performed for compressed data intact, so its decoding processing inevitably becomes necessary. This makes it necessary to process all pixels in high-resolution data for each pixel, thus prolonging the processing time. As techniques of compressing pixel data without encoding it, a known run length encoding scheme of storing pixel data and their run lengths, and a technique (for example, Japanese Patent Laid-Open No. 10-257488) of compressing pixel data by detecting an edge for each block and storing two colors of this edge have been disclosed.

In the JPEG scheme which uses discrete cosine transformation and the scheme which uses wavelet transformation, a large amount of calculation is required for each block, so the processing time prolongs and expensive processing hardware must be used. Also, decoding processing inevitably becomes necessary upon image processing for compressed data, so the processing time considerably prolongs, depending on the number of pixels to be processed. For example, high-resolution data is not always necessary depending on the purpose of use of the image data, and therefore must be reduced to low-resolution data. That is, to generate low-resolution data from high-resolution data having undergone compression coding by, for example, JPEG, decoding processing and special reduction processing inevitably become necessary.

A case in which color-reduction and lossy compression are performed in a compression scheme (for example, the above-mentioned run length encoding scheme) of performing image compression by holding only matching information with an adjacent pixel without holding each pixel value of an image will be considered. If some pixels have similar colors in the run length encoding scheme, the use of a lossy run length encoding scheme of regarding these pixels as having the same color and counting and encoding the length of a run of these pixels may propagate the color difference from the original to a plurality of pixels, leading to image deterioration. This deterioration is not limited to the run length encoding scheme and is a common problem when compression and color-reduction processing using matching information with an adjacent pixel are combined.

SUMMARY OF INVENTION

The present invention provides an apparatus and method which can minimize image deterioration due to factors associated with color-reduction and perform high-efficiency compression when image data is compressed while keeping the processing cost low.

According to one aspect of the present invention, there is provided an image processing apparatus characterized by comprising: first specification means for dividing first image data into blocks each with a size of 2×2 pixels, sequentially determining the divided blocks as first processing objects, and comparing color data of respective pixels in the block which is the first processing object, thereby specifying a first pattern flag indicating a placement pattern of the color data included in the block; first extraction means for extracting, as first color data, color data corresponding to a pixel at a predefined position in the block with the size of 2×2 pixels, and, if the number of colors included in the block which is the first processing object is one of 2 to 4, further extracting second color data to fourth color data corresponding to the placement pattern defined in the specified, first pattern flag; first output means for outputting the first pattern flag of each block specified by the first specification means, the first color data in each block extracted by the first extraction means, and the second color data to fourth color data in each block extracted by the first extraction means; second color-reduction means for dividing second image data formed from the first color data output from the first output means into blocks each with a size of 2×2 pixels, sequentially determining the divided blocks as second processing objects, and weighting each pixel value based on the first pattern flag corresponding to each pixel that forms the block which is the second processing object, thereby performing color-reduction processing for the blocks which are the second processing objects; second specification means for comparing color data of respective pixels in the block which is the second processing object after the color-reduction processing is performed by the second color-reduction means, thereby specifying a second pattern flag indicating a placement pattern of the color data included in the block which is the second processing object; second extraction means for extracting, as first color data, color data corresponding to a pixel at a predefined position in the block with the size of 2×2 pixels after the color-reduction processing is performed by the second color-reduction means, and, if the number of colors included in the block which is the second processing object is one of 2 to 4, further extracting second color data to fourth color data corresponding to the placement pattern defined in the specified, second pattern flag; and second output means for outputting the second pattern flag of each block specified by the second specification means, the first color data in each block extracted by the second extraction means, and the second color data to fourth color data in each block extracted by the second extraction means.

According to another aspect of the present invention, there is provided an image processing apparatus which performs compression processing for image data upon determining blocks each including a predetermined number of pixels as blocks of interest to be processed, characterized by comprising: color-reduction means for performing color-reduction processing for the block of interest; specification means for comparing color data of respective pixels in the block of interest, thereby specifying a placement pattern of the color data included in the block of interest; extraction means for extracting, as first color data, color data corresponding to a pixel at a predefined position in the block, and further extracting color data other than the first color data included in the block; output means for outputting the placement pattern specified by the specification means, and the first color data and the color data other than the first color data, which are extracted by the extraction means; and control means for controlling to execute color-reduction processing by the color-reduction means, for second image data formed from the first color data output from the output means, upon determining blocks each including a predetermined number of pixels as blocks of interest to be processed, thereby further controlling to re-execute, for the block of interest having undergone the color-reduction processing by the color-reduction means, processing by specification means, the extraction means, and the output means, wherein in executing the color-reduction processing for the second image data formed from the first color data output from the output means, upon determining blocks each including a predetermined number of pixels as blocks of interest to be processed, the color-reduction means executes the color-reduction processing while weighting a pixel value of each pixel included in the block of interest to be processed, based on the placement pattern specified by the specification means.

According to another aspect of the present invention, there is provided an image processing method characterized by comprising: a first specification step of using first specification means to divide first image data into blocks each with a size of 2×2 pixels, sequentially determine the divided blocks as first processing objects, and compare color data of respective pixels in the block which is the first processing object, thereby specifying a first pattern flag indicating a placement pattern of the color data included in the block; a first extraction step of using first extraction means to extract, as first color data, color data corresponding to a pixel at a predefined position in the block with the size of 2×2 pixels, and, if the number of colors included in the block which is the first processing object is one of 2 to 4, further extract second color data to fourth color data corresponding to the placement pattern defined in the specified, first pattern flag; a first output step of using first output means to output the first pattern flag of each block specified in the first specification step, the first color data in each block extracted in the first extraction step, and the second color data to fourth color data in each block extracted in the first extraction step; a second color-reduction step of using second color-reduction means to divide second image data formed from the first color data output in the first output step into blocks each with a size of 2×2 pixels, sequentially determine the divided blocks as second processing objects, and weight each pixel value based on the first pattern flag corresponding to each pixel that forms the block which is the second processing object, thereby performing color-reduction processing for the blocks which are the second processing objects; a second specification step of using second specification means to compare color data of respective pixels in the block which is the second processing object after the color-reduction processing is performed in the second color-reduction step, thereby specifying a second pattern flag indicating a placement pattern of the color data included in the block which is the second processing object; a second extraction step of using second extraction means to extract, as first color data, color data corresponding to a pixel at a predefined position in the block with the size of 2×2 pixels after the color-reduction processing is performed in the second color-reduction step, and, if the number of colors included in the block which is the second processing object is one of 2 to 4, further extract second color data to fourth color data corresponding to the placement pattern defined in the specified, second pattern flag; and a second output step of using second output means to output the second pattern flag of each block specified in the second specification step, the first color data in each block extracted in the second extraction step, and the second color data to fourth color data in each block extracted in the second extraction step.

According to another aspect of the present invention, there is provided an image processing method of performing compression processing for image data upon determining blocks each including a predetermined number of pixels as blocks of interest to be processed, characterized by comprising: a color-reduction step of using color-reduction means to perform color-reduction processing for the block of interest; a specification step of using specification means to compare color data of respective pixels in the block of interest, thereby specifying a placement pattern of the color data included in the block of interest; an extraction step of using extraction means to extract, as first color data, color data corresponding to a pixel at a predefined position in the block, and further extract color data other than the first color data included in the block; an output step of using output means to output the placement pattern specified in the specification step, and the first color data and the color data other than the first color data, which are extracted in the extraction step; and a control step of using control means to control to execute color-reduction processing by the color-reduction means, for second image data formed from the first color data output in the output step, upon determining blocks each including a predetermined number of pixels as blocks of interest to be processed, thereby further controlling to re-execute, for the block of interest having undergone the color-reduction processing in the color-reduction step, processing in the specification step, the extraction step, and the output step, wherein in the color-reduction step, in executing the color-reduction processing for the second image data formed from the first color data output in the output step, upon determining blocks each including a predetermined number of pixels as blocks of interest to be processed, the color-reduction processing is executed while weighting a pixel value of each pixel included in the block of interest to be processed, based on the placement pattern specified in the specification step.

According to the present invention, it is possible to compress image data while minimizing image deterioration due to factors associated with color-reduction and keeping the processing cost low. Using the data compressed by the present invention, the processing cost can be kept low, thus facilitating image processing.

Further features of the present invention will become apparent from the following description of exemplary embodiments with reference to the attached drawings.

BRIEF DESCRIPTION OF DRAWINGS

FIG. 3 is a view showing possible combinations of the pattern in each block;

FIG. 4 is a view showing the relationship between the patterns shown in FIG. 3 and pattern flags;

FIGS. 9A, 9B, 9C, 9D, and 9E are views showing transitions of image data obtained when compression processing is performed independently in two stages;

FIGS. 10A, 10B, 10C, 10D, and 10E are views showing image data obtained when two-stage compression processing is performed based on the first-stage compression processing result;

FIGS. 11A, 11B, 11C, 11D, and 11E are views showing image data obtained when two-stage compression processing is performed based on the first-stage compression processing result;

FIG. 12 is a view showing the relationship between the input and output when a new pattern flag is added;

FIG. 18 is a table illustrating an example of the configuration of a packet management table;

DESCRIPTION OF EMBODIMENTS

Modes for carrying out the present invention will be described in detail below with reference to the accompanying drawings. A digital MFP (MultiFunction Peripheral) having a plurality of functions such as scanning, printing, and copying will be taken as an example of an image processing apparatus in embodiments of the present invention.

[First Embodiment]

Figure 1:
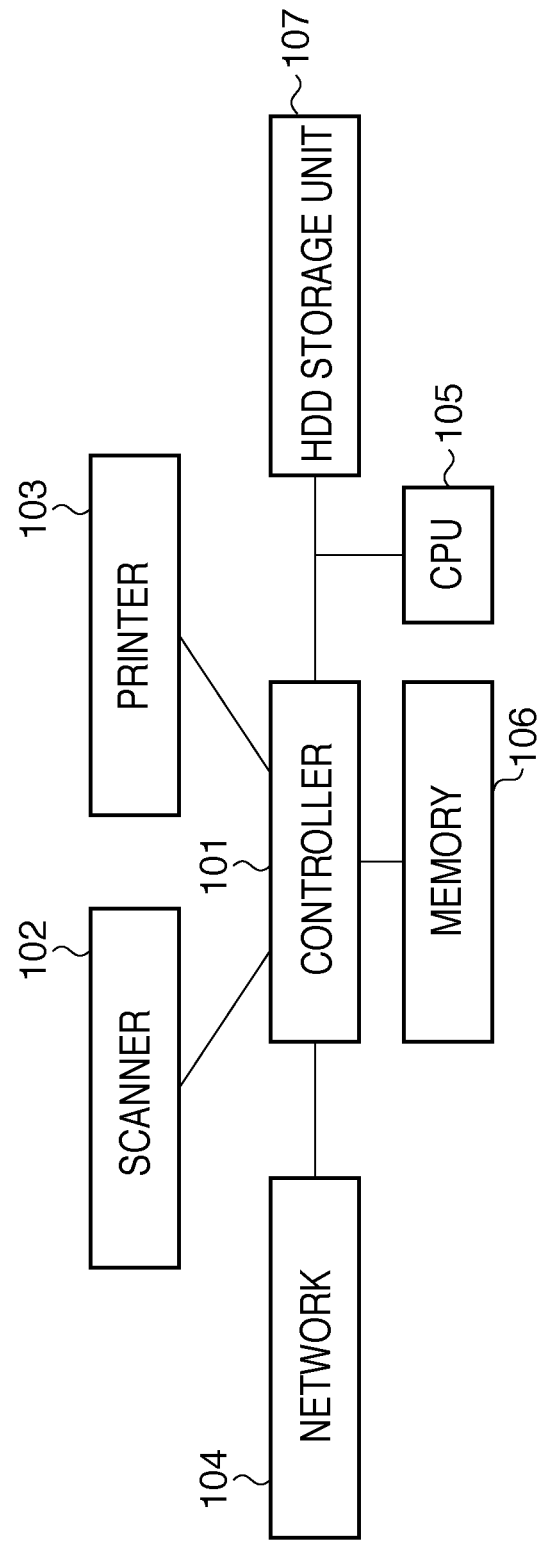
FIG. 1 is a block diagram illustrating an example of the configuration of an image processing apparatus according to an embodiment.

As shown in FIG. 1, a controller 101 is connected to a scanner 102 serving as an image input device, and a printer 103 serving as an image output device. The controller 101 is also connected to a network 104 such as a LAN or a public line (WAN) to input/output image information or device information and perform image rasterization of PDL data. A CPU 105 serves as a processor which controls the overall MFP in accordance with a program stored in an HDD storage unit 107. A memory 106 serves as a system working memory for operating the CPU 105, and also serves as an image memory for temporarily storing image data. The HDD storage unit 107 serves as a hard disk drive and stores, for example, system software, a program, and image data.

Figure 2:
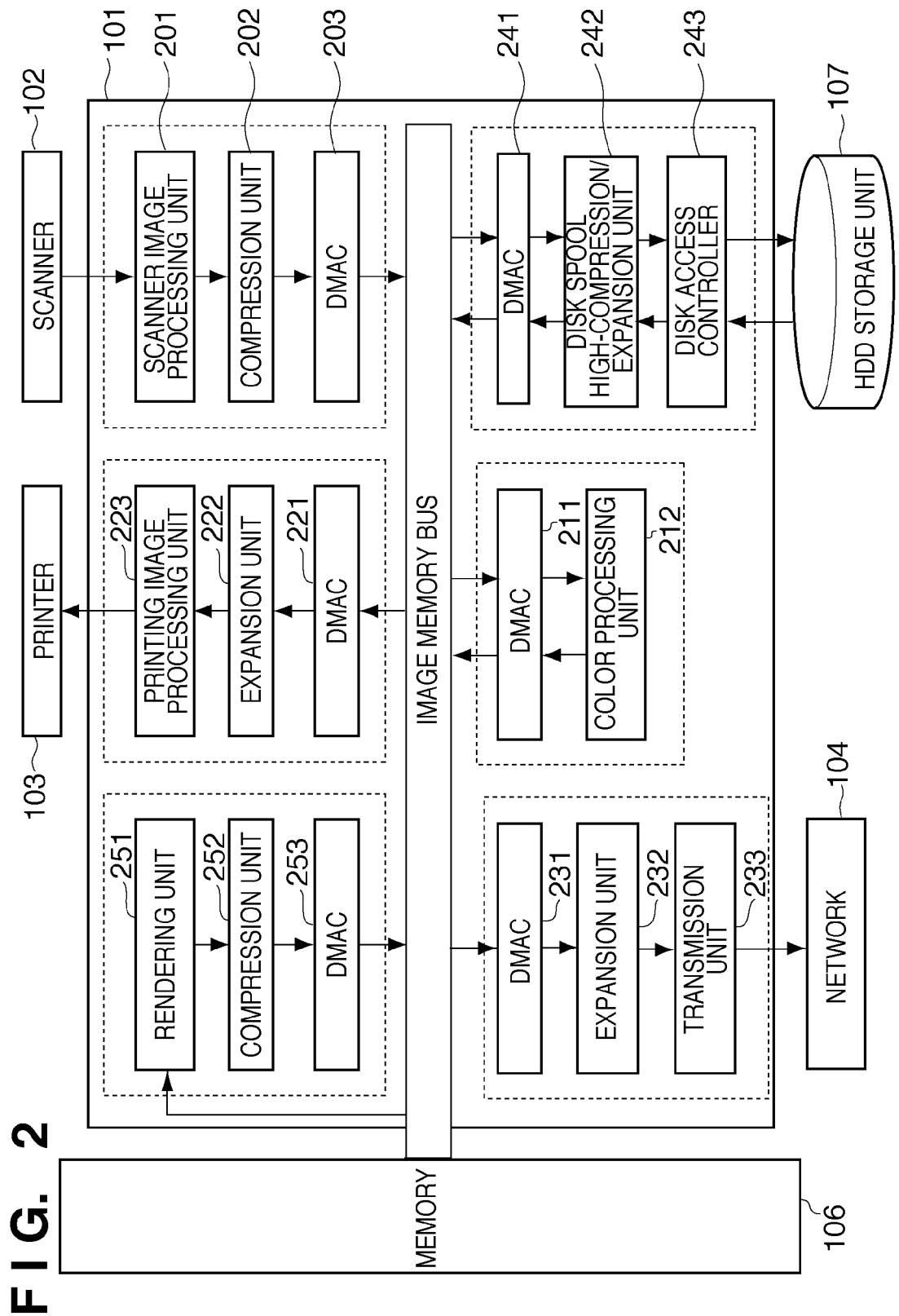
FIG. 2 is a block diagram illustrating an example of the configuration of a controller shown in FIG. 1.

Detailed processing of each unit of the controller 101 will be described next with reference to an example of the configuration of the controller 101 shown in FIG. 2. A case in which image data scanned by the scanner 102 is read will be described first. A scanner image processing unit 201 receives image data in three colors: R, G, and B (Red, Green, and Blue) read by the scanner 102, and performs image processing such as shading processing and filter processing for the received image data, and a compression unit 202 performs image compression processing for the processed data. A DMAC (Direct Memory Access Controller) 203 stores the compressed data in the memory 106 via an image memory bus.

In printing the scanned image data, a DMAC 211 transfers the compressed data stored in the memory 106 to a color processing unit 212 via the image memory bus. The color processing unit 212 converts the transferred data into data in a CMYK (Cyan, Magenta, Yellow, and Black) color space. After the color processing unit 212 performs color processing such as printer gamma correction and density adjustment for the C, M, Y, and K values of the converted data, the DMAC 211 stores the data, having undergone the color processing, again in the memory 106 via the image memory bus. To perform image processing for printing, a DMAC 221 reads the compressed data stored in the memory 106, and a rasterization unit 222 rasterizes the read data into raster image data. A printing image processing unit 223 inputs the raster CMYK image data, performs its area coverage modulation processing using the dither method or the error diffusion method, and outputs the processed data to the printer 103.

In transmitting the scanned image data to the network, the DMAC 211 transfers the compressed data stored in the memory 106 to the color processing unit 212 via the image memory bus. After the color processing unit 212 performs, for example, display gamma adjustment and sheet self-color adjustment for the transferred data, it converts the adjusted data into data in a YCbCr (luminance, blue color difference, and red color difference) color space. The DMAC 211 stores the data, processed by the color processing unit 212, again in the memory 106 via the image memory bus. To perform image processing for transmission, a DMAC 231 transfers the compressed data stored in the memory 106 to a rasterization unit 232 via the image memory bus. The rasterization unit 232 rasterizes the compressed data into raster image data. A transmission unit 233 performs JPEG compression processing for the raster YCbCr image data in case of color image transmission, or performs JBIG compression processing for the raster YCbCr image data by binarizing its Y data in case of monochrome binary image transmission, and outputs the compressed data to the network 104.

In storing the scanned image data, a DMAC 241 transfers the compressed data stored in the memory 106 to a disk spool high-compression/expansion unit 242 via the image memory bus. The disk spool high-compression/expansion unit 242 has a writing speed on the HDD, which is slower than that on the memory, and therefore performs JPEG compression at a higher compression ratio. The compressed data is stored in the HDD storage unit 107 via a disk access controller 243. Also, to transfer the compressed data stored in the HDD storage unit 107 to the memory 106 again, the above-mentioned processing need only be performed in reverse order.

A case in which PDL data sent from another device via the network 104 shown in FIG. 1 is written on the memory 106 will be described herein. Although FIG. 2 does not show a PDL (Page Description Language) interpretation unit, the CPU 105 which functions as the PDL interpretation unit interprets the PDL data, and outputs a display list obtained as a result of the interpretation to the memory 106. A rendering unit 251 renders the display list stored in the memory 106 into raster RGB image data, and a compression unit 252 performs its image compression processing. A DMAC 253 stores the compressed data in the memory 106 via the image memory bus. The PDL image data can be printed, transmitted to the network, and stored by processing similar to that for the scanned image data.

[Compression Processing]

Compression processing for raster image data as a feature of the present invention will be described in detail next. Although the compression unit 252 compresses a raster image generated from PDL data and the compression unit 202 compresses a raster image obtained by scanning in this embodiment, the present invention is not limited to such a configuration. For example, a common compression unit may be provided instead of individually providing the compression units 202 and 252 as in the case of FIG. 2.

In this embodiment, first, raster image data for each page is divided into blocks each including 2×2 pixels, and data compression is performed for each divided, extracted block. Before a description of compression processing, the number of combinations of colors that occupy data of 2×2=4 pixels will be considered in accordance with the number of these colors. A block includes four pixels, so a maximum of four colors occupy the block, and combinations of only one to four colors exist in the block. FIG. 3 shows the number of possible combinations (patterns) of these four colors.

First, when the block has only one color, the four pixels have the same color, so only one combination exists. A case in which the block has two colors will be considered next. As shown in FIG. 3, when two colors are laid out in the four pixels assuming that the upper left pixel has a first color and the other color is a second color, the first or second color is assigned to the three pixels other than the upper left pixel, so a total of seven combinations are possible upon excluding a combination when the four pixels have the same color.

A case in which the block has three colors will be considered. When three colors are laid out in the four pixels, one of the three colors is used twice, so the number of combinations when two out of the four pixels have the same color need only be obtained. In other words, in case of three colors, two coordinate positions are selected from the four coordinate positions, so a total of six combinations are possible. Lastly, when the block has four colors, only one pattern exists as in the case of only one color.

A total of 15 patterns are possible upon counting up the number of patterns in all cases of one to four colors. Considering that flags (identifiers) are assigned to all of these patterns to specify them, 4 bits are necessary as the amount of data of each flag. The relationship between these 15 patterns and the flags is defined as shown in FIG. 4, and these flags will be referred to as "pattern flags" hereinafter.

[Sequence of Processing]

Figure 5:
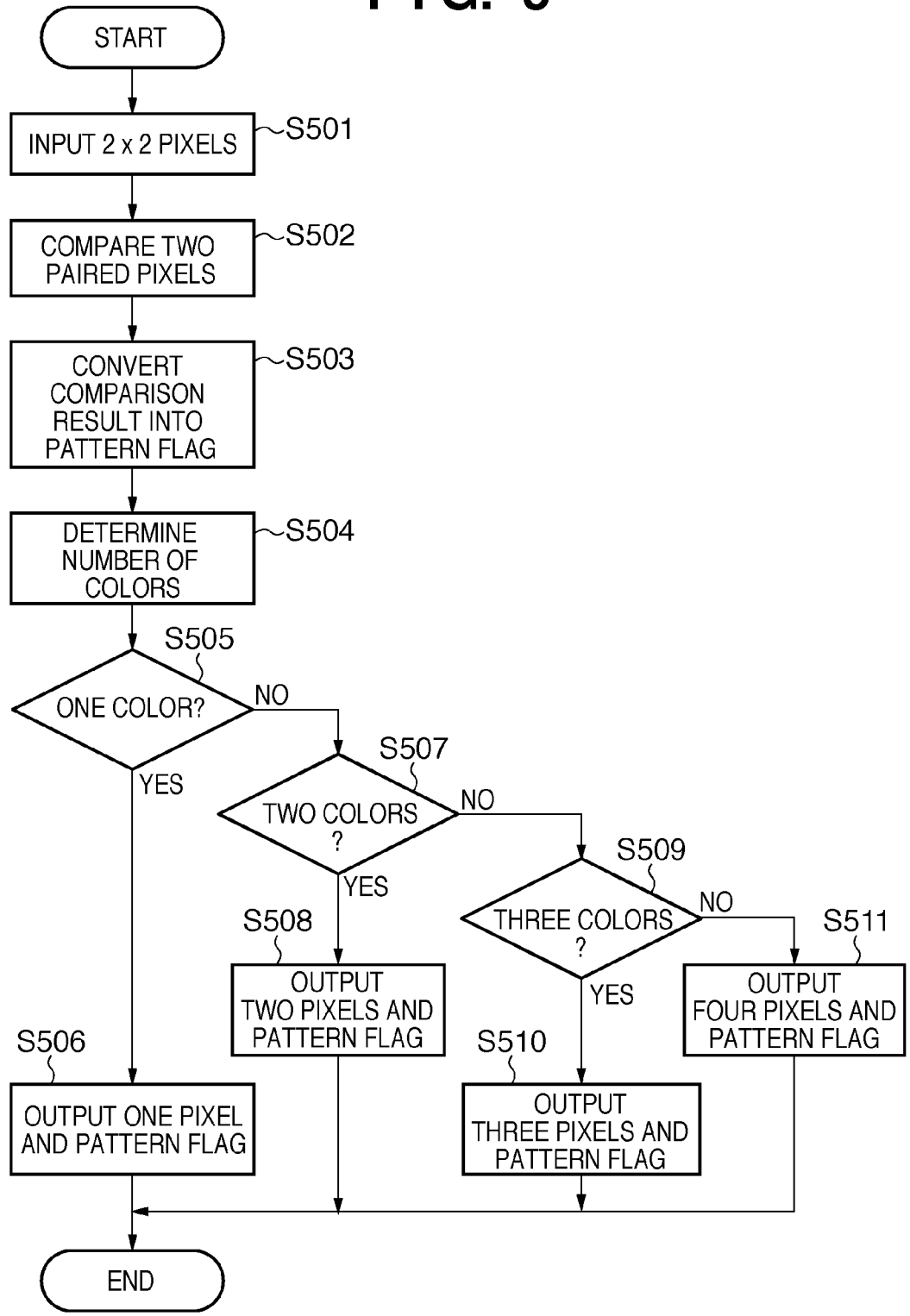
FIG. 5 is a flowchart showing processing of specifying different pixels and a pattern flag.

The sequence of processing by the compression units 202 and 252 in consideration of possible combinations of 2×2 pixels, as described above, will be described with reference to FIG. 5. In the following description, an image having, for example, R, G, and B components each with 8 bits and 256 gray levels is used as an input, and a 24-bit image for each pixel in a dot sequential system of 8-bit data is used as data.

First, a block of 2×2 pixels is input (S501), and sets of 24 bits are compared for all combinations of two pixels in this block (S502). If it is determined as a result of the comparison that all the bits coincide with each other, "1" is output; otherwise, "0" is output. The upper left, upper right, lower left, and lower right pixels of a block including 2×2 pixels have coordinate positions 1, 2, 3, and 4, respectively (reference numeral 401 shown in FIG. 4). Since the combinations of two pixels have a total of six sets of coordinate positions 1-2, 1-3, 1-4, 2-3, 2-4, and 3-4 (reference numeral 402 shown in FIG. 4), six comparisons must be made, and 6 bits are output as a result. As in the comparison results shown in FIG. 4, if all of the four pixels have the same color, is are output as all comparison results; or if all of the four pixels have different pixel values, 0s are output as all comparison results.

In this example, 15 patterns may occur from color matching among the four pixels, so a 4-bit pattern flag is specified in accordance with the 6-bit comparison result (S503), as shown in FIG. 4. The number of colors that have occurred in the four pixels and color data are extracted (S504). As shown in FIG. 4, each pattern indicating the arrangement of respective colors in the block is associated with a O-bit pattern flag (or a 6-bit comparison result), so the number of colors and color data in each block can be specified. Referring to FIG. 4 in this embodiment, the pattern flag is defined such that the color (pixel value) of the upper left pixel becomes the first color (first color data) in all patterns. If the pattern flag is 0, the number of colors is 1, so the color (pixel value) of the upper left pixel is extracted as a first color. If the pattern flag is 1 to 7, the number of colors is 2, so the color (pixel value) of the upper left pixel is extracted as a first color, and that of a pixel at a position with a second color (second color data) defined in accordance with each pattern flag is further extracted. For example, when the pattern flag is 1, the color of the upper right pixel is extracted as a second color. If the pattern flag is 8 to D, the number of colors is 3, so the color (pixel value) of the upper left pixel is extracted as a first color, and those of pixels at positions with a second color (second color data) and a third color (third color data) which are defined in accordance with each pattern flag are further extracted. For example, when the pattern flag is 8, the color (pixel value) of the upper right pixel is extracted as a second color, and that of the lower right pixel is extracted as a third color. If the pattern flag is E, the color of the upper left pixel is extracted as a first color, that of the upper right pixel is extracted as a second color, that of the lower left pixel is extracted as a third color, and that of the lower right pixel is extracted as a fourth color.

That is, the number of colors in the block is specified (S505, S507, or S509) based on the pattern flag (or the comparison result), and the pattern flag and color data corresponding to the specified number of colors are output (S506, S508, S510, or S511). The output data will be described in more detail with reference to FIG. 6.

Figure 6:
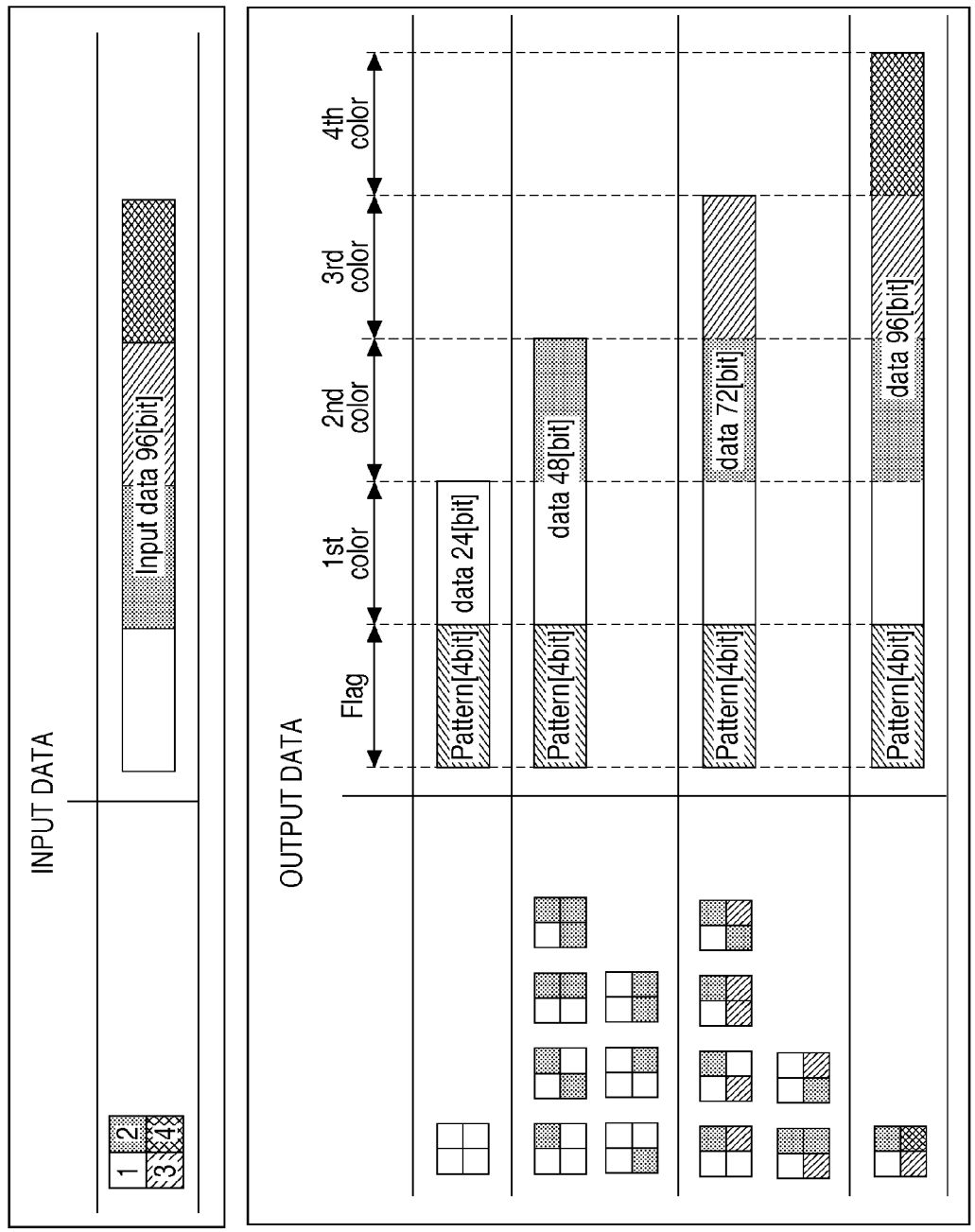
FIG. 6 is a view for explaining processing of determining the positions of pixels with different pixel values.

As shown in FIG. 6, for example, if the pattern flag is 0 (that is, the four pixels have only one color) (YES in step S505), none of the second and subsequent colors exist, so 4 bits of the pattern flag and the pixel value (color data corresponding to 24 bits) of the first color are output (S506). If the pattern flag is 1 to 7 (that is, the four pixels have two colors) (YES in step S507), the coordinate position of a pixel with the second color is calculated based on the pattern flag. Then, 4 bits of the pattern flag and the pixel values (color data corresponding to 48 bits) corresponding to two colors are output (S508). If the pattern flag is 8 to D (that is, the four pixels have three colors) (YES in step S509), 4 bits of the pattern flag and the pixels values (color data corresponding to 72 bits) corresponding to three colors are output (S510). If the pattern flag is E (that is, the four pixels have four colors) (NO in step S509), 4 bits of the pattern flag and the pixel values (color data corresponding to 96 bits) corresponding to four colors are output (S511). In other words, color data that have not previously occurred are output from each block in turn from the first color when the pixels in the block are scanned in ascending order of coordinate position (the upper left, upper right, lower left, and lower right pixels have coordinate positions 1, 2, 3, and 4, respectively).

In this manner, for input data (96 bits) of four colors in a block of 2×2 pixels, the amount of output data can be reduced with relatively simple processing by outputting a 4-bit pattern flag and pixel values equal in number to that of colors existing in the input data. Especially in a raster image having a relatively large number of blocks each including pixels with the same color (that is, blocks each having a relatively small number of colors) among 2×2 pixels, the compression ratio of the amount of output data is relatively high. Also, the number of colors in the block can be specified by referring to the pattern flag. Performing such processing for all image blocks allows data compression of the entire image field. At this time, if some pixels in the block have only a small difference, they are regarded as having the same color, and color-reduction processing is performed in each block to decrease the number of blocks determined to have four colors, thus improving the compression ratio. In this case, a threshold according to which pixels are regarded as having the same color may be held in, for example, the memory 106 in advance or be obtained by accepting designation by the user via the network 104. To accept designation by the user, a user interface intended for this operation is provided to implement a designation means.

Figure 8A:
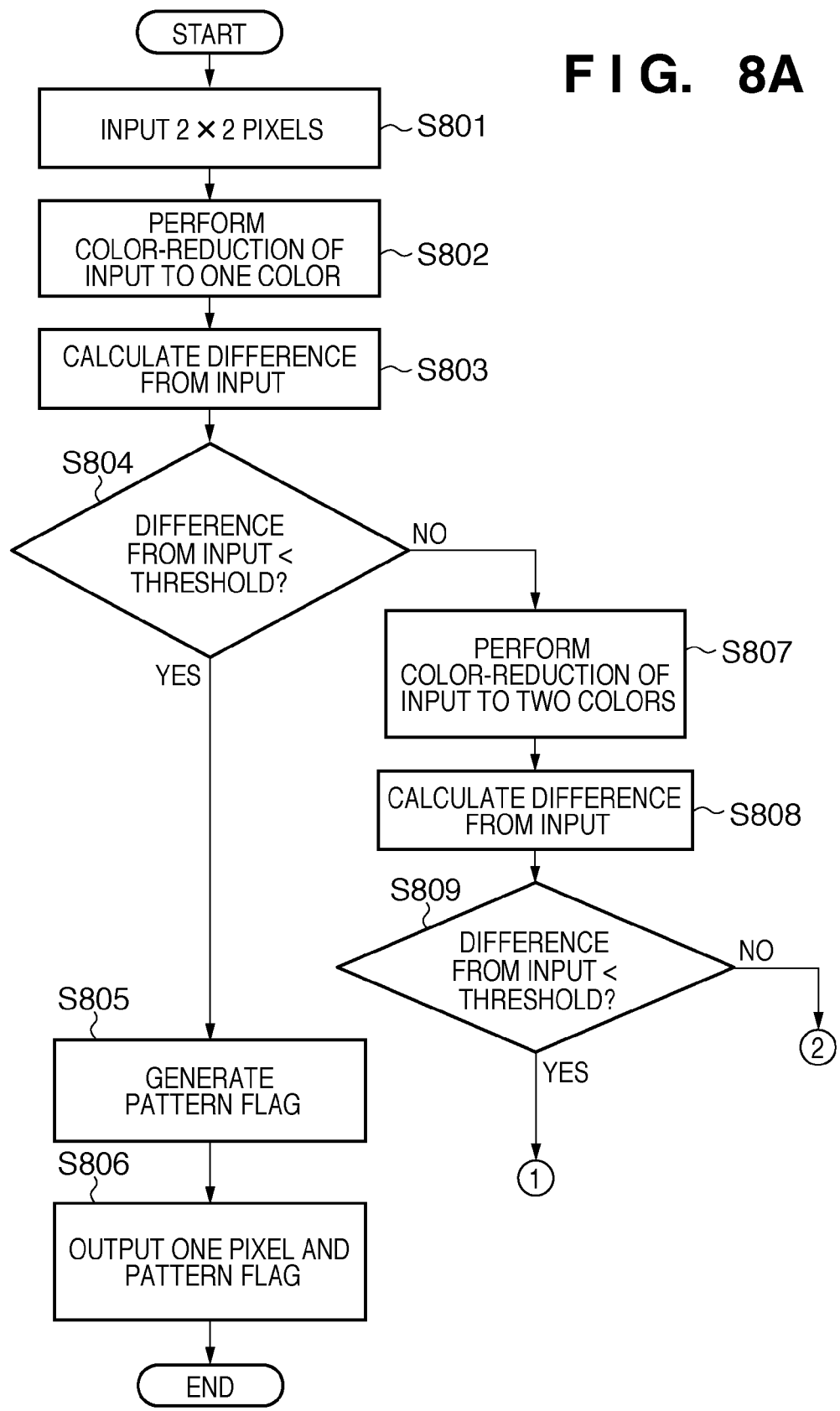
FIGS. 8A and 8B are flowcharts showing compression processing according to the first embodiment.
Figure 8B:
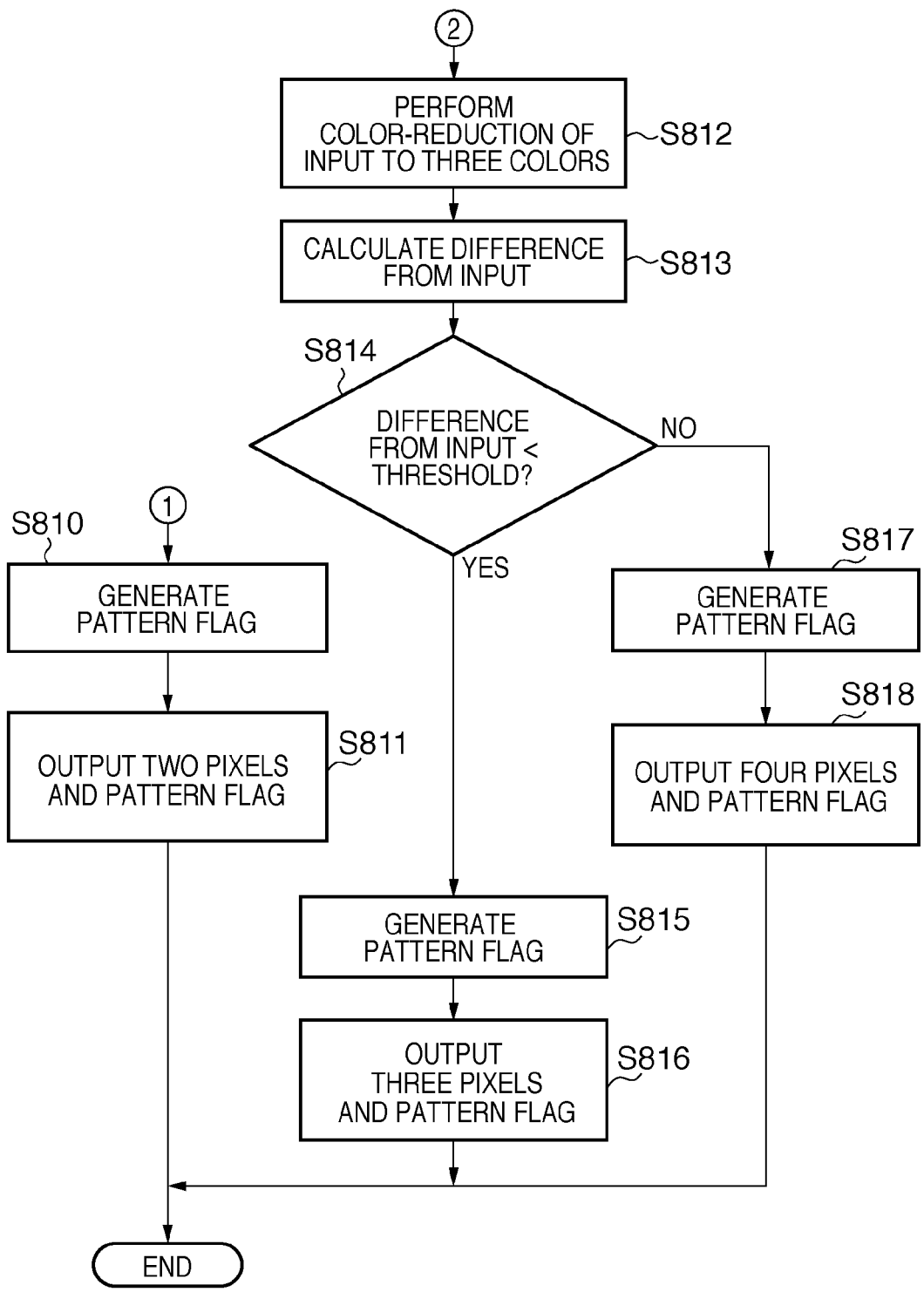

Processing of performing image compression in consideration of possible combinations of 2×2 pixels after the color-reduction processing for each block will be described with reference to FIGS. 8A and 8B. First, a block of 2×2 pixels to be processed is input (S801), and color-reduction processing is performed from the pixel values of the four pixels to one color (S802). In this case, color-reduction to one color is realized by calculating, for example, the average pixel value of the four pixels. The difference between the pixel value obtained by color-reduction and the input pixel values of the four pixels is calculated (S803). The error magnitude is determined (S804). For example, the sum of the absolute values of the differences between the input pixel values of the respective pixels and the R, G, and B values after color-reduction is obtained, and if the obtained sum is equal to or smaller than the threshold, it can be determined in step S804 that the difference is small. That is, if it is determined in step S804 that the difference is small, it is determined that color-reduction to one color is to be performed, and the pattern flag is specified as 0 (S805). The pixel value of one color obtained by color-reduction, and the specified pattern flag are output (S806).

If it is determined in step S804 that the error is large, color-reduction processing to two colors is performed subsequently (S807). In this case, two pixels A and B with a largest difference in R, G, and B values among the four pixels, for example, are extracted, and the two remaining pixels are clustered in accordance with whether they are similar to pixel A or B. Color-reduction to two colors is performed by obtaining the average of the pixel values in each cluster. The difference between the pixel values obtained by color-reduction to two colors and the input pixel values of the four pixels is calculated (S808). The error magnitude is determined based on the calculation result (S809). If it is determined in step S809 that the difference is small, a pattern flag is specified in accordance with the positions of the pixel values upon color-reduction to two colors, based on a correspondence as shown in FIG. 4 (S810). The pixel values of two colors obtained by color-reduction, and the specified pattern flag are output (S811).

If it is again determined in step S809 that the error is large, color-reduction processing to three colors is performed subsequently (S812). In this case, two pixels with a smallest difference in R, G, and B values among the four pixels, for example, are extracted, the average of the pixel values of the two extracted pixels is obtained, and color-reduction to three colors is performed using both the obtained average and the pixel values of the two remaining pixels. The difference between the pixel values obtained by color-reduction to three colors and the input pixel values of the four pixels is calculated (S813). The error magnitude is determined based on the calculation result (S814). If it is determined in step S814 that the difference is small, a pattern flag is specified in accordance with the positions of the pixel values upon color-reduction to three colors, based on a correspondence as shown in FIG. 4 (S815). The pixel values of three colors obtained by color-reduction, and the specified pattern flag are output (S816).

If it is again determined in step S814 that the error is large, it is determined that the block of interest may pose a problem in terms of image quality upon color-color reduction, so the pattern flag is specified as E (S817). The pixel values of all of the four pixels, and the specified pattern flag are output (S818).

With the foregoing procedure, the differences between the input pixel values and the pixel values obtained when color-reduction to the candidate numbers of colors color-reduction is performed in steps are sequentially compared with each other, thereby deciding the number of colors to which color-reduction is performed.

[Memory Storage Processing]

Processing (memory storage processing) in which the DMACs 203 and 253 write the thus obtained pattern flag and color data in the memory is performed next. At this time, the DMACs 203 and 253 change the positions where a pattern flag, first color data, and second, third, and fourth color data are written. Three addresses: the memory start address for writing a pattern flag, that for writing first color data, and that for writing second and subsequent color data are designated on the DMACs. That is, pattern flags of respective blocks are collectively stored in a pattern flag storage unit (a memory area for storing a pattern flag) on the memory. Also, first color data (data of the first color) in respective blocks are collectively stored in a first color storage unit (a memory area for storing first color data in each block) on the memory. Moreover, second to fourth color data in respective blocks are collectively stored in a second/third/fourth color storage unit (a memory area for storing second to fourth color data in each block) on the memory.

Figure 7:
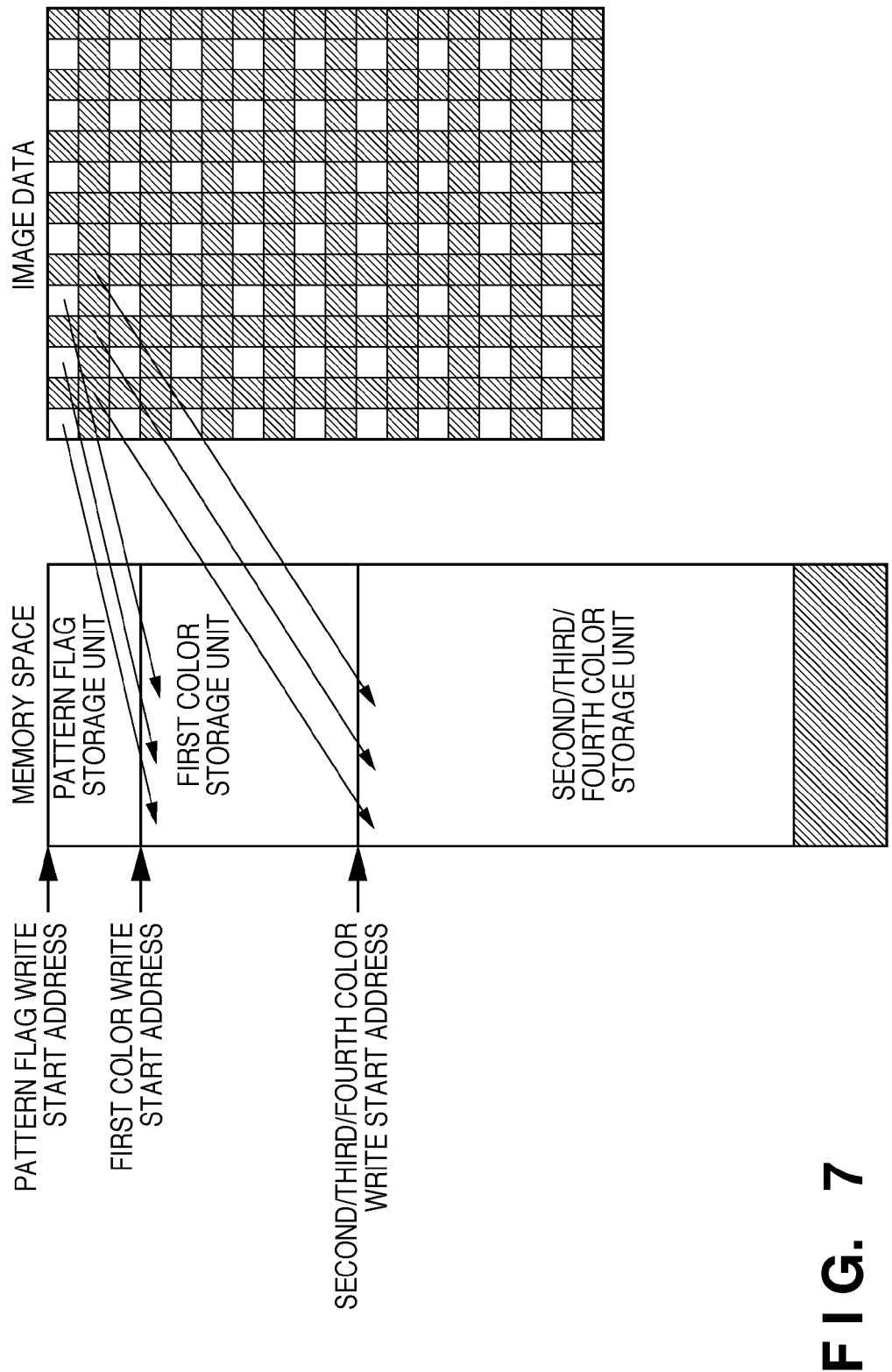
FIG. 7 is a view illustrating an example in which image data is written in a memory space by DMACs.

FIG. 7 is a view illustrating an example in which image data is written in the memory space by the DMACs. Note that when an image having a size of M×N pixels and R, G, and B components each with 8 bits is input to the compression unit, the pattern flag storage unit which stores pattern flag data has a data size of (M×N×4/8) bytes. Also, the first color storage unit which stores first color data has a data size of (M×N×24/8) bytes. Moreover, the second/third/fourth color storage unit which stores second, third, and fourth color data (that is, color data other than the first color data) has a data size which differs depending on the type of raster image to be processed. This is because the number of blocks having the second, third, and fourth colors differs between individual images.

In the memory areas (the first color storage unit and the second/third/fourth color storage unit) at memory addresses subsequent to the first color writing start address, color data of each pixel is stored while the number of its bits is maintained intact. That is, the color (pixel value) of each pixel can be specified even without decoding and restoring compressed data to a raster image, unlike compressed data in, for example, the JPEG format. Hence, to perform, for example, color processing which is completed by one pixel input/output, such as color conversion which uses an LUT, gamma correction processing, and color space conversion processing which uses a matrix operation, the stored data can be directly processed, as shown in FIG. 7, without requiring restoration to the original raster image. To perform image processing for each pixel by the color processing unit 212 shown in FIG. 2, pixel data at memory addresses subsequent to the first color writing start address on the memory 106 are read via the DMAC 211, processed for each pixel, and rewritten on the memory 106. At this time, when the number of bits of each pixel remains the same regardless of some kind of processing for each pixel, the capacity of the memory 106 can be saved by rewriting the processed data at the same location on the memory 106.

In this manner, directly using compressed data, the transfer efficiency on the memory bus improves, and color data fewer than pixels of the original raster image are processed, thus allowing high-speed processing.

[Example of Practical Application of Data Structure]

As shown in FIG. 7, image data is divided into a pattern flag, a first color, and other colors, and discretely stored in the memory. Hence, pixel values (color data) obtained when a raster image is divided into blocks each including 2×2 pixels and a pixel at the coordinate position corresponding to the upper left in each block is sampled are continuously present on the memory in the first color storage unit.

The MFP has functions of, for example, preview display of accumulated PDL image data and scanned image data and the above-mentioned network transmission. For example, even if the print resolution is 600 dpi, the preview display and transmission normally do not require such a high resolution but require only a resolution of 300 dpi or less in many cases. In this manner, when thumbnail data must be obtained, a half-size raster image can be easily obtained by collectively extracting only the first color data stored in the first color storage unit.

Reduction transmission when, for example, a 600-dpi raster image is converted into data as shown in FIG. 7 and accumulated will be described. If 300 dpi is designated as the resolution of the image to be transmitted, the data stored in the first color storage unit need only be directly extracted and transmitted. However, if a resolution higher than 300 dpi sampled in the first color storage unit, such as 400 dpi, is designated, the following processing is performed. That is, based on the data stored in the pattern flag storage unit, first color storage unit, and second/third/fourth color storage unit, the compressed data is rasterized once, the rasterized data is scaled using known scaling processing, and the scaled image is transmitted. If a transmission resolution lower than 300 dpi is designated, scaling processing to the designated resolution is performed using only the data in the first color storage unit.

In this way, data reading can be performed while switching the resolution in accordance with the required image size.

In this manner, as long as an image (the data stored in the first color storage unit) with a size half the original image can be obtained, it is also possible to re-execute the same compression operation (multistage compression) using the half-size image as an input. The higher the resolution of the input image data, the higher the probability that adjacent pixels are determined to have the same pixel value. Hence, a certain level of redundancy still remains in a thumbnail image of such a high-resolution image, so a high compression ratio is still expected to be obtained even upon multistage compression processing. For example, when compression processing is performed in two stages, the amount of data is expected to further decrease by replacing the data which is obtained as the first-stage compression processing result and stored in the first color storage unit with that obtained as the second-stage compression processing result. In this case, the original input image data is defined as first image data, and image data having undergone compression processing once is defined as second image data. Also, a block in the first image data is defined as a block which is a first processing object, and that in the second image data is defined as a block which is a second processing object. A pattern flag (first pattern flag) obtained as the first-stage processing result, a pattern flag (second pattern flag) obtained as the second-stage processing result, first color data obtained as the second-stage processing result, second to fourth color data obtained as the second-stage processing result, and second to fourth color data obtained as the first-stage processing result, are output. As for the processing as well, compression processing for the first image data includes a first color-reduction step, first specification step, first extraction step, and first output step, and that for the second image data includes a second color-reduction step, second specification step, second extraction step, and second output step.

[Problem Associated with Multistage Compression]

However, the following problem is posed upon continuously performing lossy compression which accompanies color-reduction as mentioned above in multiple stages. This problem will be explained in detail with reference to FIGS. 9A, 9B, 9C, 9D, and 9E. For the sake of descriptive simplicity, the pixel value of each pixel is expressed by 0 to 255 in FIGS. 9A, 9B, 9C, 9D, and 9E. In practice, the average or error, for example, is calculated using the pixel value in an RGB color space.

Figures 9A, 9B, 9C, 9D, 9E:
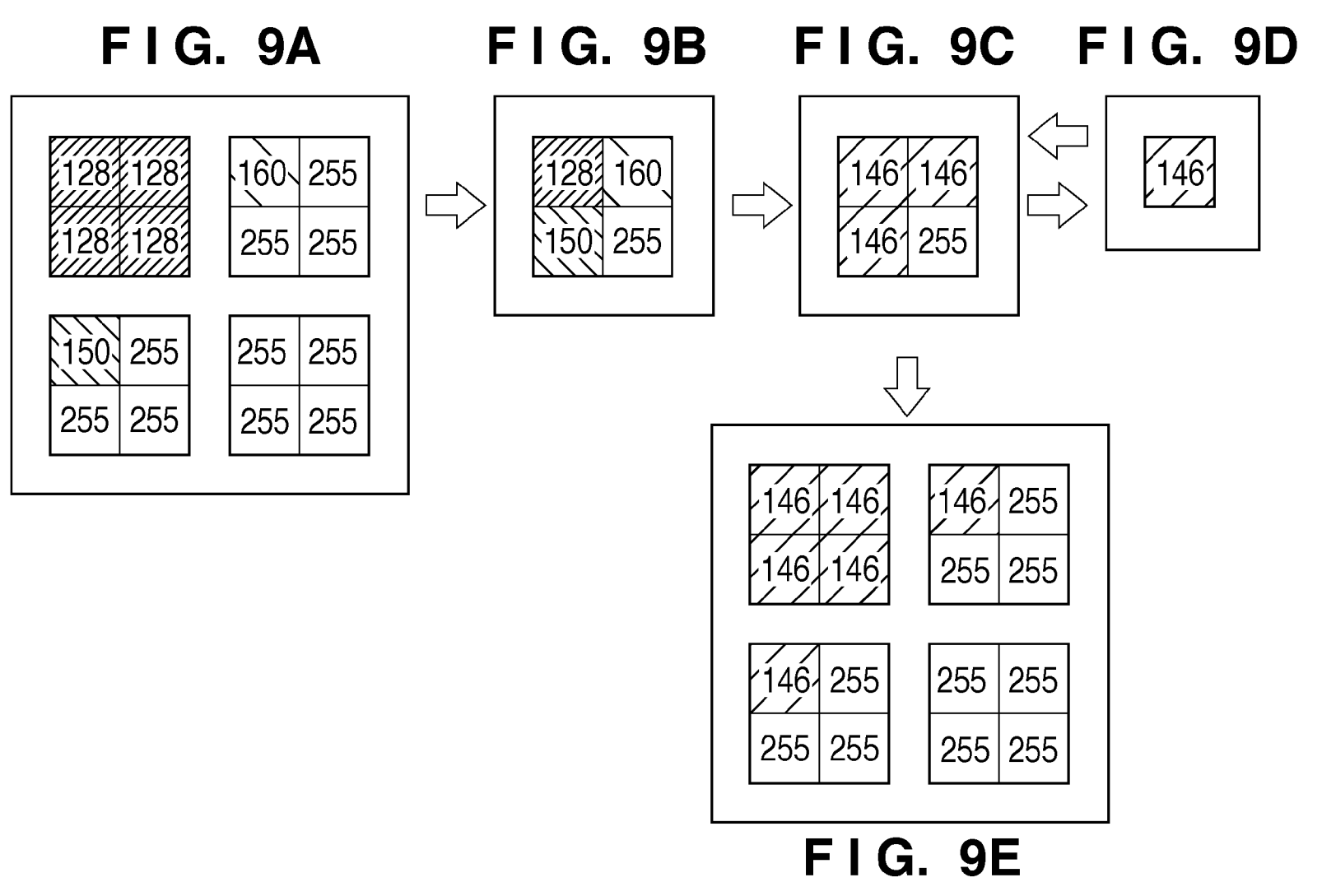

First, when 4×4 pixels (that is, four blocks each including 2×2 pixels) as shown in FIG. 9A are input, a pattern flag indicating the color arrangement and color information (first to fourth color data) in each block are obtained by the first-stage compression processing. Although color-reduction processing may be performed in the first-stage compression processing, the error becomes so large that color-reduction does not take place (the pixel values remain the same despite the application of color-reduction processing) in case of pixels shown in FIG. 9A.

When first color data in each block is extracted (a half-size image is obtained) from the first-stage compression processing result, a block of 2×2 pixels, as shown in FIG. 9B, is output. This block corresponds to the result of sampling the upper left pixels in the input 2×2 blocks, and has pixel values as shown in FIG. 9B. Execution of the second-stage compression processing using this block as an input will be considered herein again. First, color-reduction processing is performed for the input block, as described earlier. For example, when a threshold according to which the sum of errors with respect to the input, that occur upon color-reduction, is tolerated up to 45 in each block is adopted, and a block of 2×2 pixels (FIG. 9B) having undergone the first-stage compression is input, it is determined that color-reduction to two colors is possible. As a result, the average of the three, upper left, upper right, and lower left pixels is calculated, and color-reduction is performed to obtain a block of 2×2 pixels as shown in FIG. 9C as a result. The error at that time is 36. The pattern flag of two colors, the pixel value of the lower right pixel, and the pixel value (FIG. 9D) of the upper left pixel, are output as the second-stage compression result. However, this data is expanded into that as shown in FIG. 9C first, and the data shown in FIG. 9C is further expanded into that as shown in FIG. 9E. That is, data as shown in FIG. 9E is obtained as the final 4×4 pixels, so the sum of errors with respect to the original data in each block is 72 in the upper left block, 14 in the upper right block, 4 in the lower left block, and 0 in the lower right block, and the upper left block exceeds the allowable value. Also, the error with respect to the input is 90 in total. This occurs as 2×2 pixels are processed using the same weight in the second-stage compression. Upon the first-stage compression, each of the upper left and lower right blocks shown in FIG. 9A has only one color. When the values of the upper left and lower right pixels shown in FIG. 9B obtained by sampling the upper left pixels in the input blocks are expanded based on the pattern flag, the expansion result is copied and propagated to four pixels, as shown in FIG. 9A. However, when color-reduction processing is performed in the second-stage compression, a color-reduction result as shown in FIG. 9C is obtained. Therefore, when this data is expanded based on the pattern flag, data as shown in FIG. 9E is obtained. That is, the pixel values of the upper left and lower right pixels shown in FIG. 9C are expanded into four pixels, so the area over which the error generated upon color-reduction propagates also becomes four pixels. Hence, the range over which the error generated upon color-reduction exerts an influence widens.

[Multistage Compression Processing]

Figures 10A, 10B, 10C, 10D, 10E:
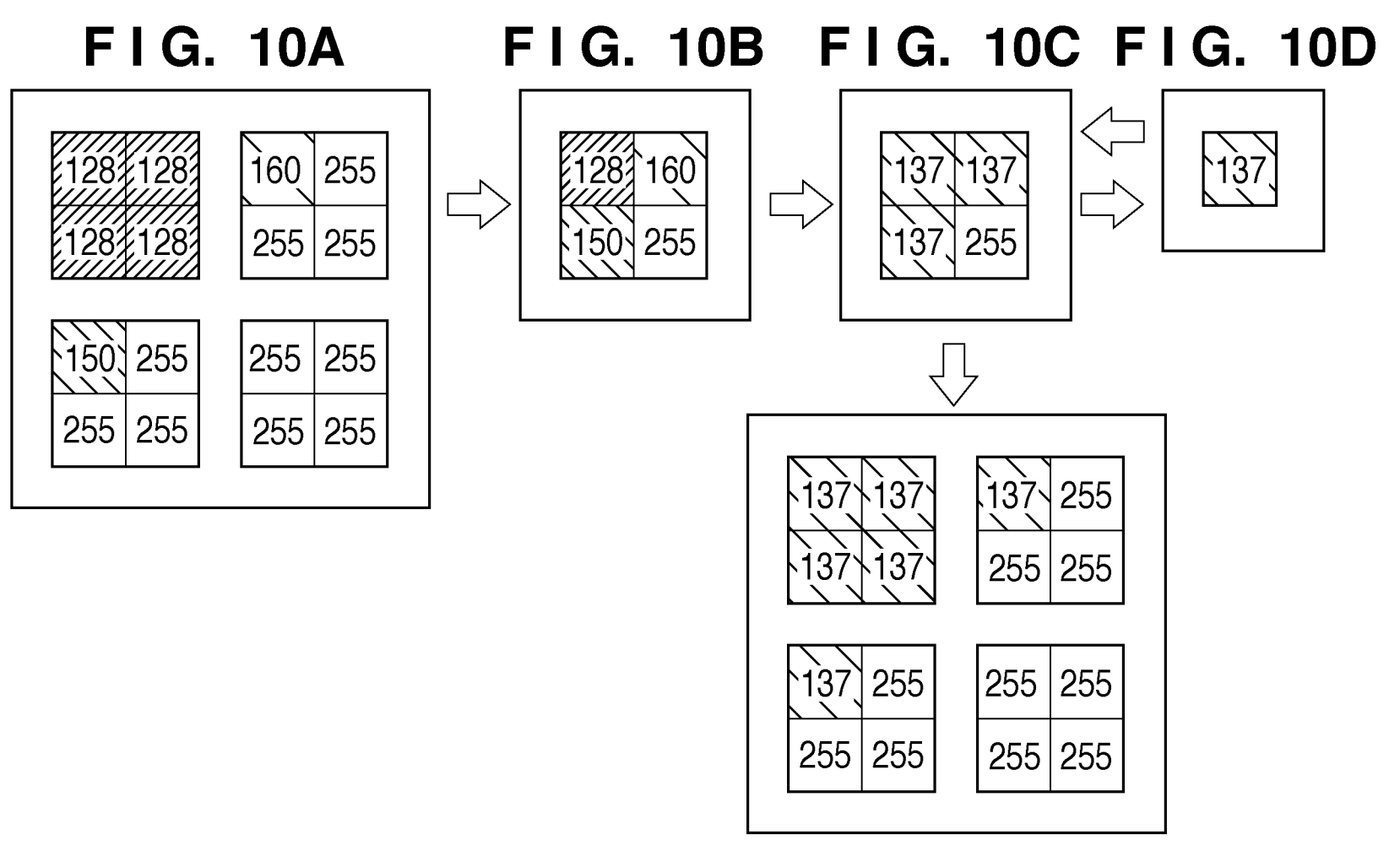

To combat this situation, in the present invention, it is determined how each pixel has been compressed in the first-stage compression (that is, the actual occupied area corresponding to the original size of each pixel is determined), and the second-stage color-reduction/compression processing is performed in consideration of the extent to which color-reduction exerts an influence. This processing will be explained in detail with reference to FIGS. 10A, 10B, 10C, 10D, and 10E. FIG. 10A shows 4×4 pixels which are used as an input and are identical to those shown in FIG. 9A, and FIG. 10B shows an image which is obtained by the first-stage compression and is identical to that shown in FIG. 9B. In color-reduction processing in the second-stage compression, the color-reduction value is calculated in consideration of the range over which each pixel exerts an influence in the first-stage compression.

More specifically, referring to FIG. 10B, the upper left pixel influences four pixels, the upper right pixel influences one pixel, the lower left pixel influences one pixel, and the lower right pixel influences four pixels. This fact can be determined by referring to the pattern flags prior to the first-stage compression because pattern flag "0" is assigned to the upper left and lower right pixels (all pixels have the same color). That fact can also be determined because pattern flag "4" is assigned to the upper right and lower left pixels. In this manner, it can be determined that the upper left and lower right pixels shown in FIG. 10B exert a great influence in expansion, so color-reduction processing is performed for these pixels by assigning a quadruple weight to them to calculate their average. The weighted average is obtained such that the weight increases as the number of pixels which exert a great influence in expansion increases (a quadrupole weight is assigned to a pixel expanded into four pixels, a triple weight is assigned to a pixel expanded into three pixels, and a double weight is assigned to a pixel expanded into two pixels). At this time, it is determined that color-reduction to two colors can be performed for the data as shown in FIG. 10B, and the average calculation result obtained in this case is data as shown in FIG. 10C, unlike that as shown in FIG. 9C. This is because the average of three pixels other than the lower right pixel is calculated by assigning a quadrupole weight to the upper left pixel. At this time, the error is 45, which does not exceed the allowable threshold. The pixel value (FIG. 10D) of the upper left pixel is finally output as a first color, together with a pattern flag (pattern flag "6" indicating two colors), and a second color (the pixel value of the lower right pixel), as in the case of FIG. 9C. The data shown in FIG. 10D is expanded into that as shown in FIG. 10C first, and the data shown in FIG. 10C is further expanded into that as shown in FIG. 10E. At this time, the sum of errors with respect to the original data in each block is 36 in the upper left block, 23 in the upper right block, 13 in the lower left block, and 0 in the lower right block, so none of them exceed the allowable value. Also, the error with respect to the input is 72 in total, so the error is smaller than that of the data shown in FIGS. 9A, 9B, 9C, 9D, and 9E.

In other words, it is determined based on the pattern flag the number of pixels influenced by each compressed pixel when it is decoded. The pixel values of an image having undergone color-reduction by weighting the value of each compressed pixel in accordance with the number of pixels to be influenced by it in expansion to calculate the average are used as those used in the next compression.

Figures 11A, 11B, 11C, 11D, 11E:
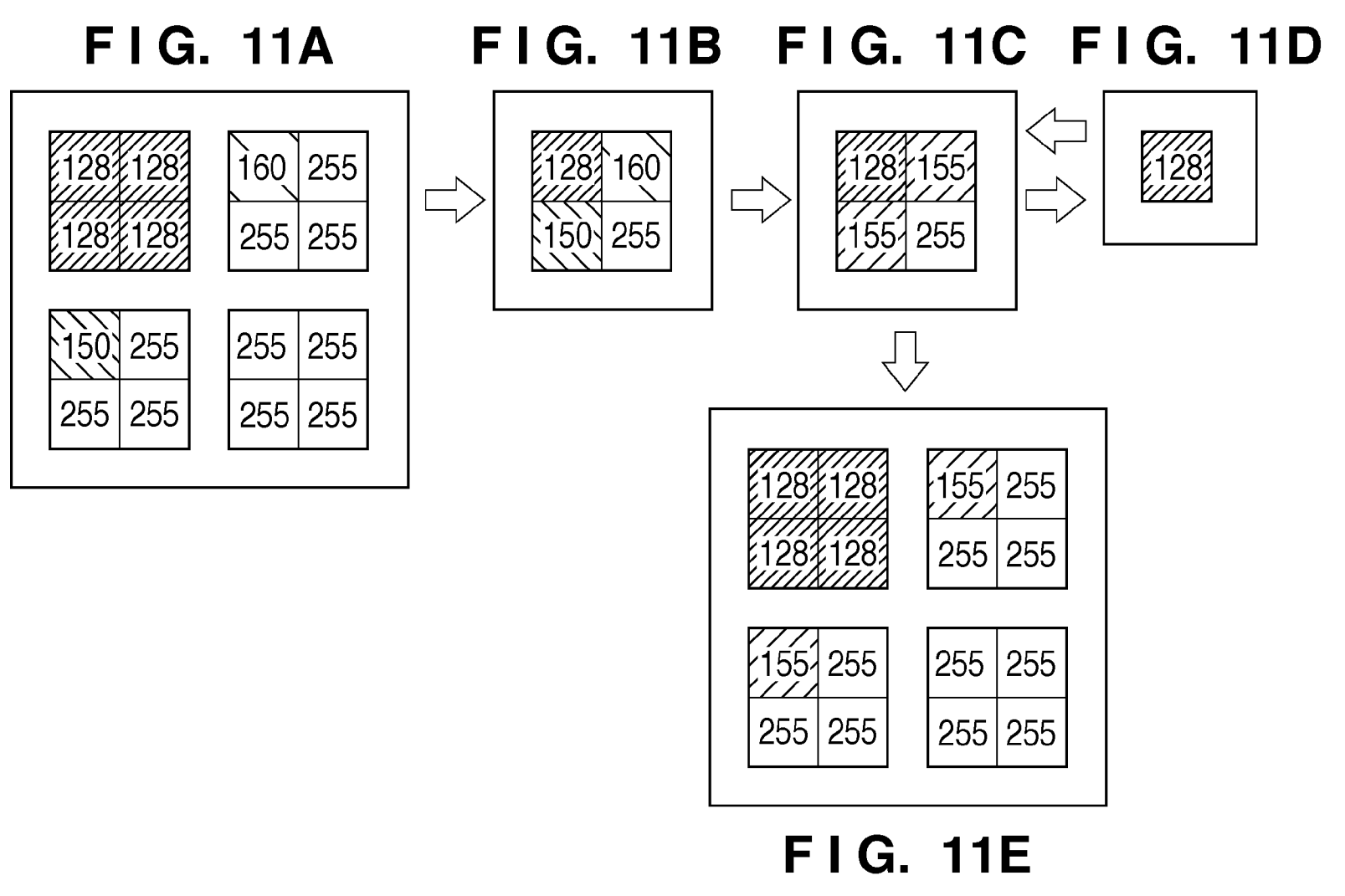

Although the allowable error threshold is 45 in the above-mentioned example, a case in which the allowable value is decreased to more strictly evaluate the image quality will be described next with reference to FIGS. 11A, 11B, 11C, 11D, and 11E. In this case, if the allowable error threshold is exceeded upon color-reduction to two colors in the second-stage color-reduction, color-reduction to two colors becomes impossible in practice. An original image shown in FIG. 11A is identical to that in the above-mentioned example, and a first color-reduction processing result shown in FIG. 11B is also identical to that shown in FIG. 10B. The second-stage color-reduction processing is subsequently performed in consideration of the extent to which each pixel exerts an influence in the first-stage color-reduction, as in the above-mentioned example. In this case, if the allowable error threshold is set smaller than 45 (for example, to 40), color-reduction to three colors alone is tolerated. When color-reduction to three colors is performed for the data shown in FIG. 11B, data as shown in FIG. 11C is obtained. The sum of errors of the data which is shown in FIG. 11C and is a block having undergone color-reduction to three colors becomes 10, and a pixel value (first color pixel value) (FIG. 11D) obtained from the upper left pixel, a pattern flag (pattern flag B indicating three colors), and second and third color pixel values are finally output. This data is expanded into that as shown in FIG. 11C first, and the data as shown in FIG. 11C is further expanded into that as shown in FIG. 11E. The error with respect to the original data in each block upon expansion into the 4×4 pixels shown in FIG. 11E is 0 in the upper left pixel, 5 in the upper right pixel, 5 in the lower left pixel, and 0 in the lower right pixel, and the error with respect to the input is 10 in total. The error can be reduced by adding data on one pixel to the 4×4 pixels in terms of data.

The second-stage compression processing uses an image with a resolution half that of an image used in the first-stage compression processing, so the tolerance for image deterioration is lower in the second-stage compression processing than in the first-stage compression processing. In other words, spread of deterioration over a wide range can be prevented by limiting the tolerance for deterioration to a larger degree as the stage level increases.

In this manner, by performing color-reduction processing in consideration of the range over which each pixel has an influence on neighboring pixels before the second- and subsequent-stage compression, image deterioration can be minimized although the amount of data may often increase upon this processing.

[Rasterization Processing]

The rasterization units 222 and 232 paired with the compression units 202 and 252, respectively, will be described next. Note that the rasterization units 222 and 232 perform processing of restoring a pattern flag and color data, as mentioned above, to raster image data. Three addresses: the pattern flag writing start address, the first color writing start address, and the second/third/fourth color writing start address of the compressed data arranged on the memory 106 as shown in FIG. 7 are designated on the DMACs 221 and 231. The DMACs 221 and 231 read out data from the three addresses, and transfer them to the rasterization units 222 and 232, respectively.

The rasterization units 222 and 232 interpret a 4-bit pattern flag first to calculate the number of colors in the block. In addition to first color data, second, third, and fourth color data are read out in accordance with the number of colors, and the first color data and the second to fourth color data are rearranged in accordance with the placement pattern (FIG. 4) of the color data defined in advance for each pattern flag. With the foregoing sequence, a block of 2×2 pixels is rasterized and decoded.

To obtain a half-size image, the rasterization units 222 and 232 require neither a pattern flag nor second, third, and fourth color data, as described above, so only the first color-writing start address is designated on the DMACs 221 and 231. Thus, only the first color data is read from the memory 106 to form an image. With this processing, the memory bus bandwidth can be saved.

As described above, according to the first embodiment, it is possible not only to save the memory capacity and the memory bus bandwidth using a relatively simple compression scheme, but also to reduce the processing load in image processing or reduction scaling for each pixel. Although the pattern indicating the arrangement of color data and the pattern flag are associated with each other as shown in FIG. 4 in the first embodiment, the present invention is not limited to this. For example, the pattern indicating the arrangement of color data and the pattern flag may be associated with each other and defined in advance such that the pixel value of the lower right pixel in a block of 2×2 pixels represents a first color. Also, although a size of 2×2 pixels is used as the block size in the first embodiment, the present invention is not limited to this. Moreover, although compression has been described by taking R, G, and B components each with 8 bits as an example of image data, data represented by a CMYK color space, grayscale data, or data having pixel values other than 8 bits may be adopted.

The method of using the average of the R, G, and B values in color-reduction processing, described in the first embodiment, is merely an example, and other known color-reduction processing methods can also be used. For example, another known method of obtaining the color difference can be substituted for the above-mentioned method (however, note that weighting is done based on a predetermined criterion in consideration of the influence of the higher-stage compression (first-stage compression) at this time, as described earlier). Also, although only two stages of compression are set in the first embodiment, the present invention is not limited to this.

As has been described earlier, in the MFP, a wide variety of image input means such as a means which uses a scanner and that obtained from a network are adopted and have different resolutions. Also, the number of types of image input means increases depending on their purposes of use. For example, even the same data input from a scanner requires a resolution as relatively high as 600 dpi for copying, but often requires only a resolution of 300 dpi or less for network transmission or facsimile transmission. Also, if PDL data is input, the user can select an appropriate one of a plurality of resolutions (typically, 600 dpi or 1,200 dpi) from a driver in accordance with the printer resolution. In this manner, the processing speed, the data size, and the image quality can be optimized by switching and optimizing the number of compression stages in accordance with various resolutions.

Taking a PDL image as an example, the image size differs by four times depending on whether a document created using word processing software is printed as a 600- or 1,200-dpi image. However, both the 600- and 1,200-dpi image data have the same actual contents, so the redundancy is higher in the latter than in the former. Hence, if a 1,200-dpi image is input, three-stage compression is performed to compress it into a 300-dpi image, and if a 600-dpi image is input, only two-stage compression is performed. Although differences occur in image deterioration and performance because a large number of times of compression are necessary, 1,200-dpi data normally has a high redundancy, as described earlier, so no large difference occurs between 600- and 1,200-dpi data as long as they are identical PDL data.

In scanned data as well, the data size and the performance can be optimized by switching the number of compression stages in accordance with the input resolution such that, for example, only two-stage compression is performed for 600-dpi data and only one-stage compression is performed for 300-dpi scanned data for transmission.

Although the pattern flag is defined such that the upper left pixel has the first color, as described with reference to FIG. 4, in this embodiment, the present invention is not limited to this. The pattern flag and the placement pattern may be associated with each other such that a pixel (for example, the lower right pixel) at another position has the first color.

[Second Embodiment]

The second embodiment according to the present invention will be described in detail next with reference to the accompanying drawings. Another processing of compressing the raster image data described in the first embodiment will be described in the second embodiment. Note that an MFP will be taken as an example of an image processing apparatus in the second embodiment, as in the first embodiment.

An image expected to be highly compressed by the compression method according to the above-described embodiment has a large number of regions in which the adjacent pixel values in the image represent the same color or have differences between them, which are so small that they can be regarded as representing the same color after color-reduction. When attention is focused on such image regions, it is often the case that not only the adjacent pixel values in a single block of 2×2 pixels but also those in adjacent blocks each including 2×2 pixels represent the same color or have differences between them, which are so small that they can be regarded as representing the same color.

In view of this, a compression method which focuses attention not only on the similarity between pixels in a single block, as in the compression method described in the first embodiment, but also on the similarity with pixels in an adjacent block will be described in the second embodiment. As has been described earlier, referring to FIG. 4, the possible pattern flag of a block of 2×2 pixels has 15 patterns which are represented by 4 bits. Because the 4-bit pattern flag can have 16 patterns, it still has room to describe another pattern. Hence, the pixel values of a block immediately preceding the currently processed block are stored. Then, if it can be determined that the pixel values in the current block and those in the preceding block coincide with each other (or are sufficiently close to each other upon color-reduction) throughout all the pixels, a flag indicating that the current block is identical to the preceding block is set without outputting the pixel values (color data) of the current block. In this case, to determine whether the pixel values in these two blocks are sufficiently close to each other, a predetermined threshold is held in advance or designated by the user. By assigning the remaining pattern of 4 bits to this pattern flag, the data can further be compressed without changing the number of bits of the pattern flag described in the above-described embodiment.

FIG. 12 is a view showing the number of bits when a flag (to be referred to as a repeat flag hereinafter) indicating that the same pattern as in the preceding block is obtained is added as a new pattern flag. In this example, "F" indicating coincidence with the previous block (no pixel values are newly output) is added as a new pattern flag. A block having pattern flag F can be represented by 4 bits of the pattern flag, as shown in FIG. 12. That is, because a block having pattern flag F can be rasterized by referring to the pixel values (color data) and pattern flag in the preceding block, no pixel values (color data) need to be stored, thus improving the compression ratio.

Figure 13:
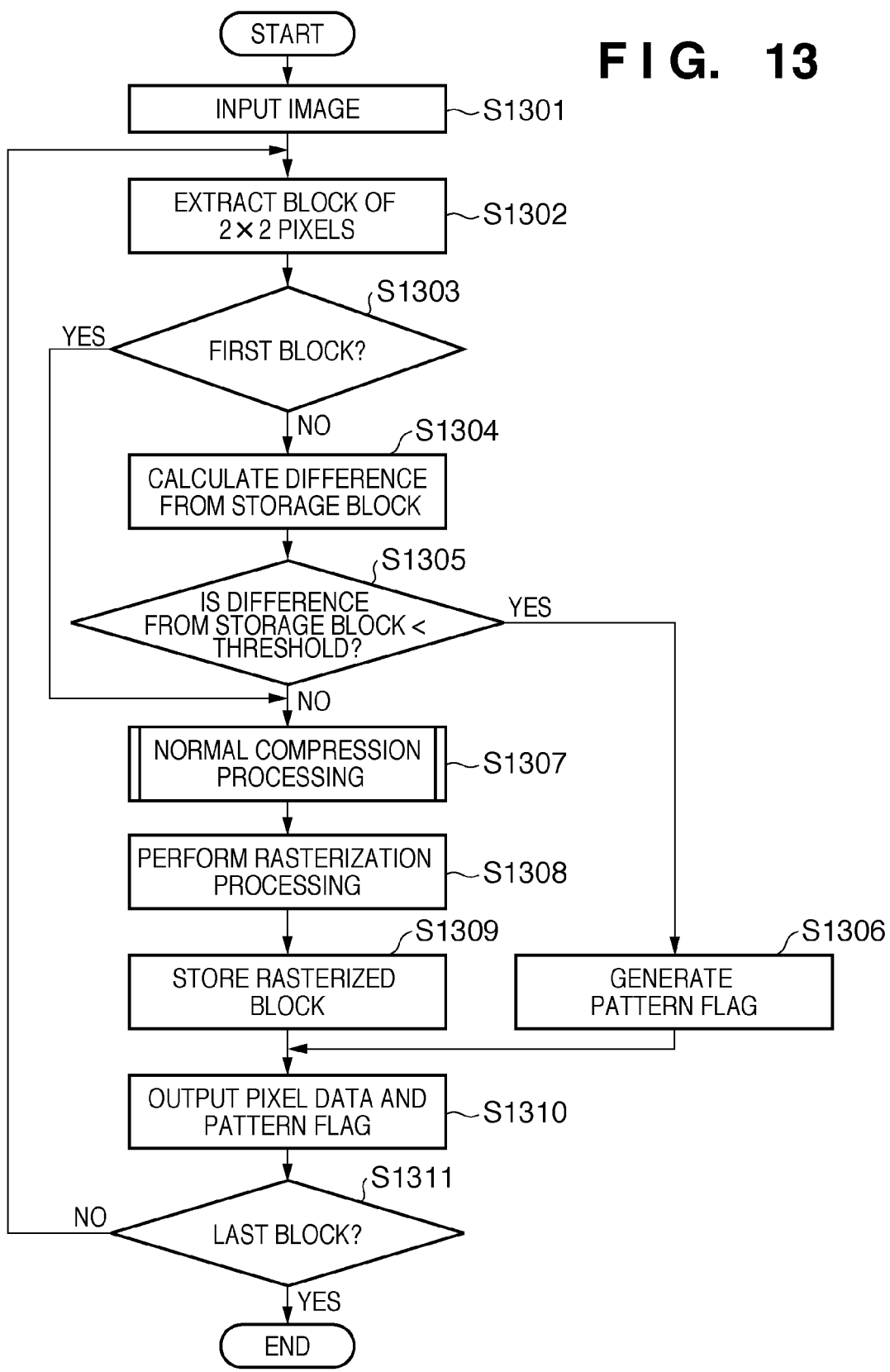
FIG. 13 is a flowchart showing compression processing according to the second embodiment.

Compression processing according to the second embodiment will be described in detail herein with reference to FIG. 13. First, raster image data is input (S1301). A block of 2×2 pixels is extracted from the input image data (S1302). If the extracted block is the first block, no block has been processed in the past (YES in step S1303), so compression processing is performed (S1307), as in the first embodiment. On the other hand, if the extracted block is not the first block (NO in step S1303), processing of calculating the difference from the block having been processed immediately before it and stored is performed (S1304). This processing can be done by obtaining, for example, the sum of the absolute values of the differences between the pixel values at identical coordinate positions. If the difference is smaller than the threshold, it is determined in step S1305 that the same data as in the preceding block stored immediately before the current block can be used (YES in step S1305). Pattern flag F indicating that the current block is identical to the preceding block is specified (S1306). In this case, no pixel values (color data) are output. That is, if it is determined in step S1305 that the difference between the block which is the current processing object and that which has become a processing object before it is small, pattern flag F (repeat flag) indicating repetition of the preceding block is output for the block which is the current processing object.

If it is determined in step S1305 that the threshold is not smaller than the threshold (NO in step S1305), it is determined that the data on the preceding block cannot be reused due to a large difference from the preceding block, and the same compression processing as in the above-described embodiment is performed (S1307). After that, the compressed data is rasterized (S1308). The rasterized block of 2×2 pixels is stored and updated as the data on the preceding block (S1309). Although the data on the preceding block is updated in steps S1308 and S1309 after compression processing is performed in step S1307, the present invention is not limited to this. For example, the data on the preceding block may be updated using the pixel values in the block which is the current processing object, before compression processing is performed in step S1307.

A pattern flag and color data obtained as a result of the compression processing in step S1307 are output for a block having a difference from the storage block, which is not smaller than the threshold, and only pattern flag F is output for a block having a difference from the storage block, which is smaller than the threshold (S1310). By repeating the above-mentioned processing until the last block is processed (YES in step S1311), compression processing for the entire image is completed.

[Additional Processing for Data]

By applying the above-mentioned sequence, the number of bits of the pattern flag remains 4 bits, thus making it possible to more reliably improve the compression ratio than in the first embodiment.

Figure 14:
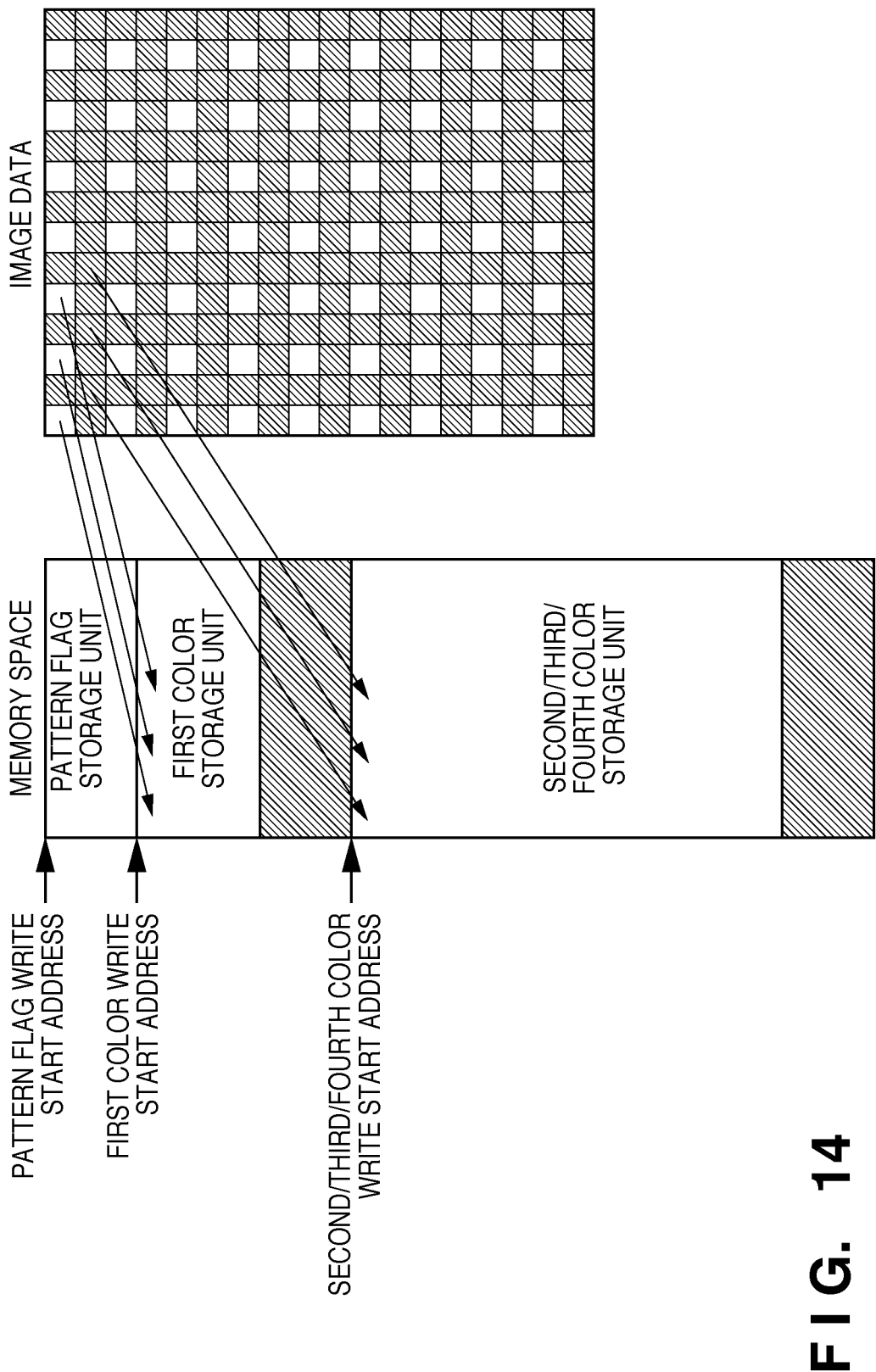
FIG. 14 is a view illustrating an example in which image data is written in a memory space in the second embodiment.

However, the image size of the first color data becomes indeterminate (differs between individual images), like the second, third, and fourth color data. Therefore, as shown in FIG. 14, second, third, and fourth color data cannot be stored in the memory space at addresses continuous to that of first color data, so the first color data and the second, third, and fourth color data must be discretely held in it. The color processing unit 212 which is shown in FIG. 2 and has been described earlier can read pixel data at an address subsequent to the first color writing start address on the memory 106 via the DMAC 211, and rewrite it on the memory 106 after processing is completed for each pixel. However, in the second embodiment, the first color is not continuous with the second, third, and fourth colors, so not only the address of the first color but also the second/third/fourth color writing start address must be designated on a DMAC 211 of a color processing unit 212.

In this manner, although the compression ratio is expected to improve by assigning a pattern flag including coincidence with the preceding block, and performing compression processing, partial rasterization processing is necessary to obtain an image with a size half the original image. In other words, pattern flag data is read, simultaneously with reading of first color data. In the process of reading, if pattern flag F indicating repetition of the preceding block is read, an image with a size half the original image can be obtained by repeatedly using the first color at that time. In this processing, first color data and pattern flag F need only be read, and none of second, third, and fourth color data are necessary. The half-size image rasterized once in this way can be compressed again.

However, if the image is compressed by a multistage method, the above-mentioned rasterization processing unnecessarily occurs for compression other than the final-stage compression. To prevent this, if it is determined from the beginning that multistage compression is to be performed, compression including that of blocks adjacent to the preceding block, as described previously, is performed in the final-stage compression without performing compression based on coincidence with the preceding block, as described earlier, in compression other than the final-stage compression. This makes it possible to reduce the trouble to obtain a half-size image.

Although a block positioned on the immediately left side of the block of interest is defined as the preceding block, and the coincidence or non-coincidence state with respect to the preceding block is held as the state of the block of interest, the present invention is not limited to this. For example, coincidence with a wider area can be defined by, for example, adopting coincidence with a block positioned on the upper side of the block of interest or expanding the number of bits of the pattern flag.

[Rasterization Processing]

Rasterization processing paired with compression processing will be described next. In the rasterization processing, a pattern flag and pixel data, as mentioned above, are restored to raster image data. Three addresses: the pattern flag writing start address, the first color writing start address, and the second/third/fourth color writing start address of the compressed data arranged on a memory 106 as shown in FIGS. 11A, 11B, 11C, 11D, and 11E are designated on DMACs 221 and 231. The output of the preceding block is directly used as that of the block of interest if it is specified that the block of interest is identical to the preceding block by referring to the pattern flag of the block of interest, and rasterization can be done using the above-mentioned method if a flag other than that indicating to that effect is obtained. At this time, one block must be buffered because it may be used for the next block.

However, to halve the image size by rasterization processing, data on a block, which coincides with that on an adjacent block, cannot be rasterized only by reading first color data from the memory 106 to form an image, as described earlier. To combat this situation, in the rasterization processing of the second embodiment, a half-size image is restored based on the first color data while referring to the pattern flag. This obviates the need to use second, third, and fourth color data. More specifically, if it is specified that the block of interest is identical to the preceding block by referring to the pattern flag of the block of interest, rasterization can be done by repeatedly outputting the preceding color data among the first color data. This makes it possible to save the memory bus bandwidth.

According to the second embodiment, by focusing attention on the similarity with an adjacent block, the redundancy between blocks can be reduced, thus further enhancing the compression ratio. This makes it possible to obtain the same effect as that obtained by executing the color processing which is completed by one pixel input/output, described in the above-described embodiment.

[Third Embodiment]

The third embodiment according to the present invention will be described in detail next with reference to the accompanying drawings. In the third embodiment, the random access performance is improved by changing or modifying the compression processing for raster image data in the above-described embodiments. Note that an MFP will be taken as an example of an image processing apparatus in the third embodiment, as in the first embodiment.

As described earlier, the compression processing used is variable-length compression processing in which the size of compressed data of image data changes depending on the type of image data. For this reason, this processing has poor random access performance to compressed data and is therefore unsuitable for, for example, partially extracting and processing an image.

Figure 15:
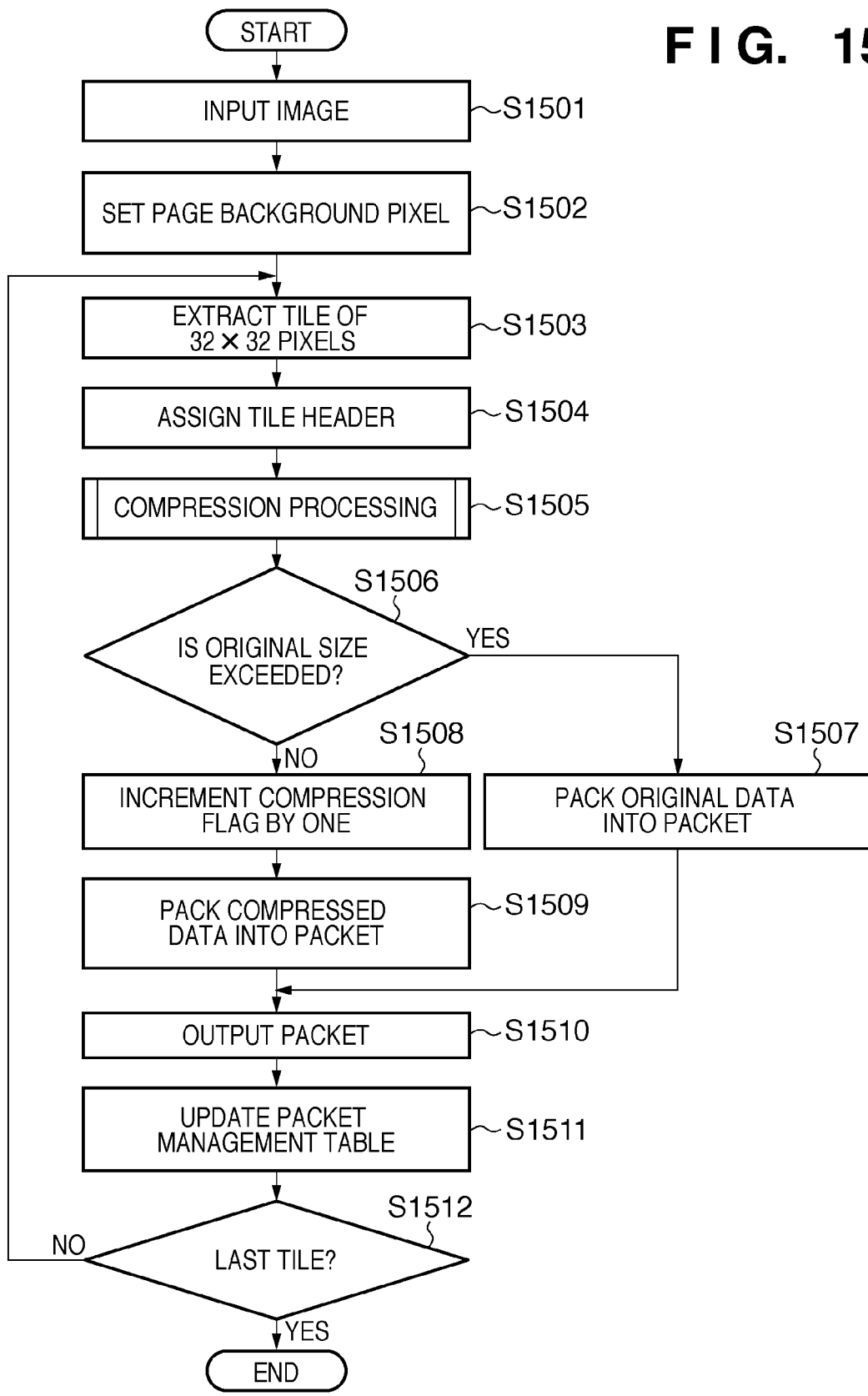
FIG. 15 is a flowchart showing compression processing according to the third embodiment.
Figure 16:
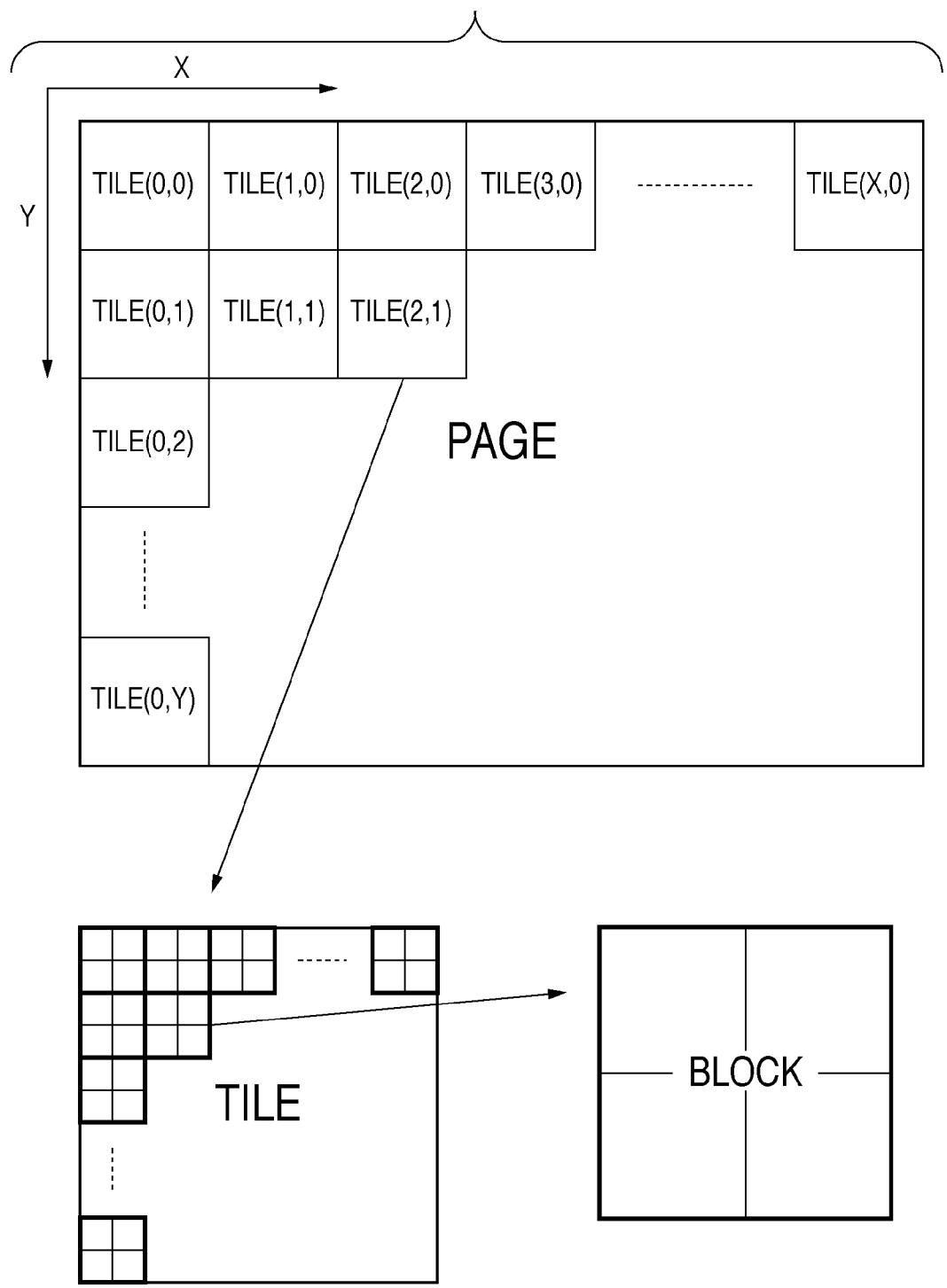
FIG. 16 is a view showing the relationship among a page, tiles, and blocks.

Hence, a compression method which focuses attention on further improving the random access performance compared to the methods described in the above-described embodiments will be described in detail with reference to FIG. 15. First, raster image data is input for each page shown in FIG. 16 (S1501). One page background pixel is set for each page of the image data (S1502). This pixel data is used as the initial storage block in compression processing, and typically adopts white (255 for an image with 8 bits for each of R, G, and B colors, and 0 for a CMYK image). Image data which is an input to a compression unit 202 is divided for each predetermined size (S1503). In the third embodiment, the predetermined size corresponds to 32×32 pixels. In the following description, a group of these divided pixels will be referred to as a "tile" in order to discriminate it from the block of 2×2 pixels described previously. One tile includes 16×16 blocks each including 2×2 pixels. FIG. 16 is a view showing the relationship among a page, tiles each including 32×32 pixels, and blocks each including 2×2 pixels.

Header information with a predetermined fixed length is assigned to each tile (S1504). The header describes pieces of information such as the page ID, the tile coordinate position, the color space, the number of bits of pixel data, the data size of a tile, the presence/absence of attribute information, and the compression flag. The page ID describes an ID number which is uniquely assigned to each page. The tile coordinate position is coordinate position information indicating the position of the tile on a raster image for each page. In this case, the tile coordinate position is represented by a two-dimensional coordinate position defined by X- and Y-coordinates. The coordinate position information corresponds to the X- and Y-coordinates shown in FIG. 16. The color space is information indicating an identifier used to determine whether the tile is an RGB image, a CMYK image, or a grayscale image. The number of bits of pixel data is information indicating the bit length per pixel in the tile. The data size is information indicating the sizes of first color data and second, third, and fourth color data of the tile in units of bytes. The presence/absence of attribute information is information indicating whether attribute information such as a text and a photo is assigned to the image data for each pixel. The compression flag is information on a flag indicating whether the tile is compressed data or uncompressed data and the number of compression stages applied to the compressed data. Note that the compression flag will be described in more detail later.

Compression processing is applied for each tile mentioned above (S1505). This compression processing is the same as that described in the above-described embodiments, and a description thereof will not be given. Note that in compressing the first block of 2×2 pixels, the initial storage block is defined as a storage block, and a block filled with the background pixels is used as this storage block. Thus, pixel data of the first block of 2×2 pixels need not be output for every tile, thereby making it possible to reduce the corresponding amount of data. This is because a normal document image has white, so the amount of data is most likely to be reduced when background pixels are set to have white, as described above.

The size of the tile data having undergone the compression processing is calculated. The calculated size is the sum total of the pattern flag size, the first color data size, and the second, third, and fourth color data size. Because pattern flags are always assigned to the tile data, there is no guarantee that the tile data is compressed more highly than the original image data. Hence, if the size of the tile data exceeds that of the original tile data, it may be as well to output the original image data in terms of achieving a higher compression ratio in total. Therefore, the data size after compression and the original data size are compared with each other (S1506). If the data size after compression exceeds the original data size (YES in step S1506), the compression flag value of the header remains the same. On the other hand, if the data size after compression does not exceed the original data size (NO in step S1506), the flag value is incremented by one (S1508).

Figure 17:
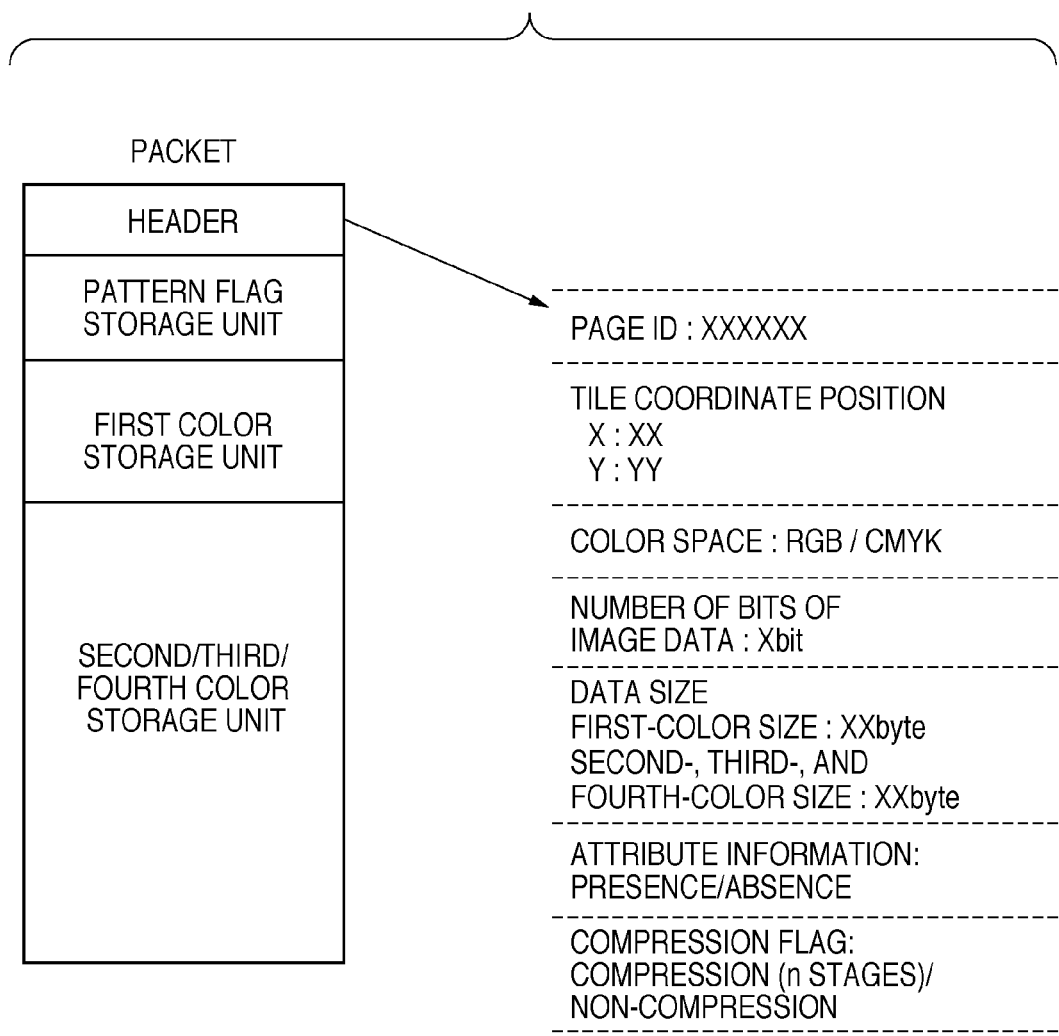
FIG. 17 is a view showing the structure of packed data.

In response to the above-mentioned comparison result, after the processing in step S1508, the compressed tile data is packed into one data, together with the header information of the tile (S1509). On the other hand, if it is determined as a result of the comparison that the data size after compression exceeds the original data size (YES in step S1506), the original tile data is packed into one data, together with the header information of the tile (S1507). FIG. 17 shows the structure of the packed data. The unit of data including the above-mentioned header will be referred to as a "packet" hereinafter. To generate such a packet, after the data size is determined upon completion of compression processing for each tile, data is packed while the distance between the first color storage unit and the second/third/fourth color storage unit is narrowed.

After the processing in step S1507 or S1509, the data is output onto the memory via the DMAC (S1510). The coordinate position and size of this packet are listed to generate a packet management table (S1511). FIG. 18 illustrates an example of this packet management table. By repeating the above-mentioned processing until the last block is processed (YES in step S1512), compression processing for the raster image for each page is completed.

Figure 19:
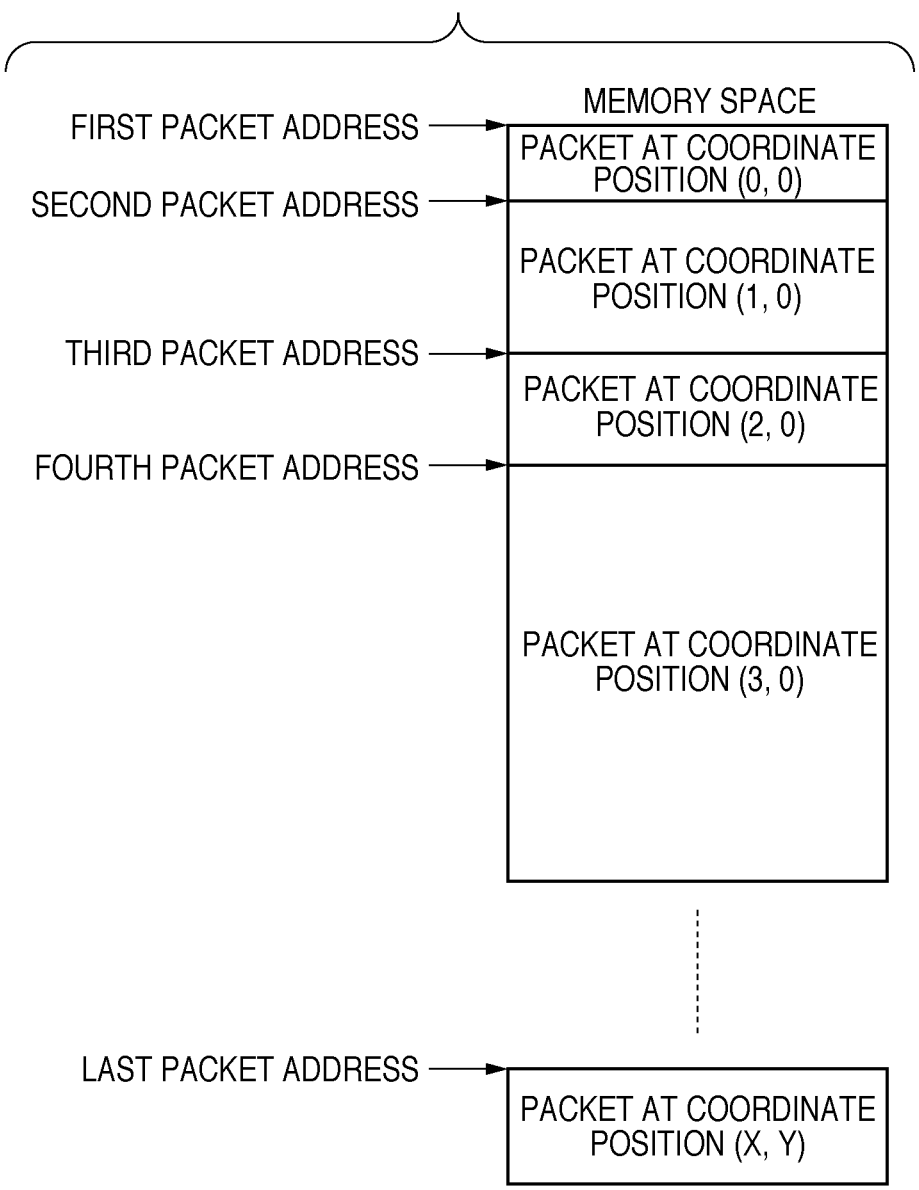
FIG. 19 is a view showing the address of each packet written in a memory space.

When the data is written on the memory for each tile mentioned above, the size differs for each packet, as shown in FIG. 19, so the start address of each packet is at a position corresponding to the size of the packet. Hence, a start address corresponding to a packet at an arbitrary coordinate position in the tile is searched for using the packet management table shown in FIG. 18. Therefore, if the writing address of the first packet is known, a start address corresponding to an arbitrary packet can be obtained using the data size up to the coordinate position described in the packet management table as an offset. For example, to read the third packet shown in FIG. 19, the sum total of the sizes of the first and second packets is obtained based on the packet management table, and the address of the first packet is multiplied by the offset, thereby calculating the third packet address. Data on the third packet can be obtained by reading the data at the third packet address.

In this manner, because arbitrary data can be accessed for each tile, an image can be partially processed. For example, to extract and process a partial region in an image, data on a packet corresponding to this region need only be obtained and processed.

Figure 20:
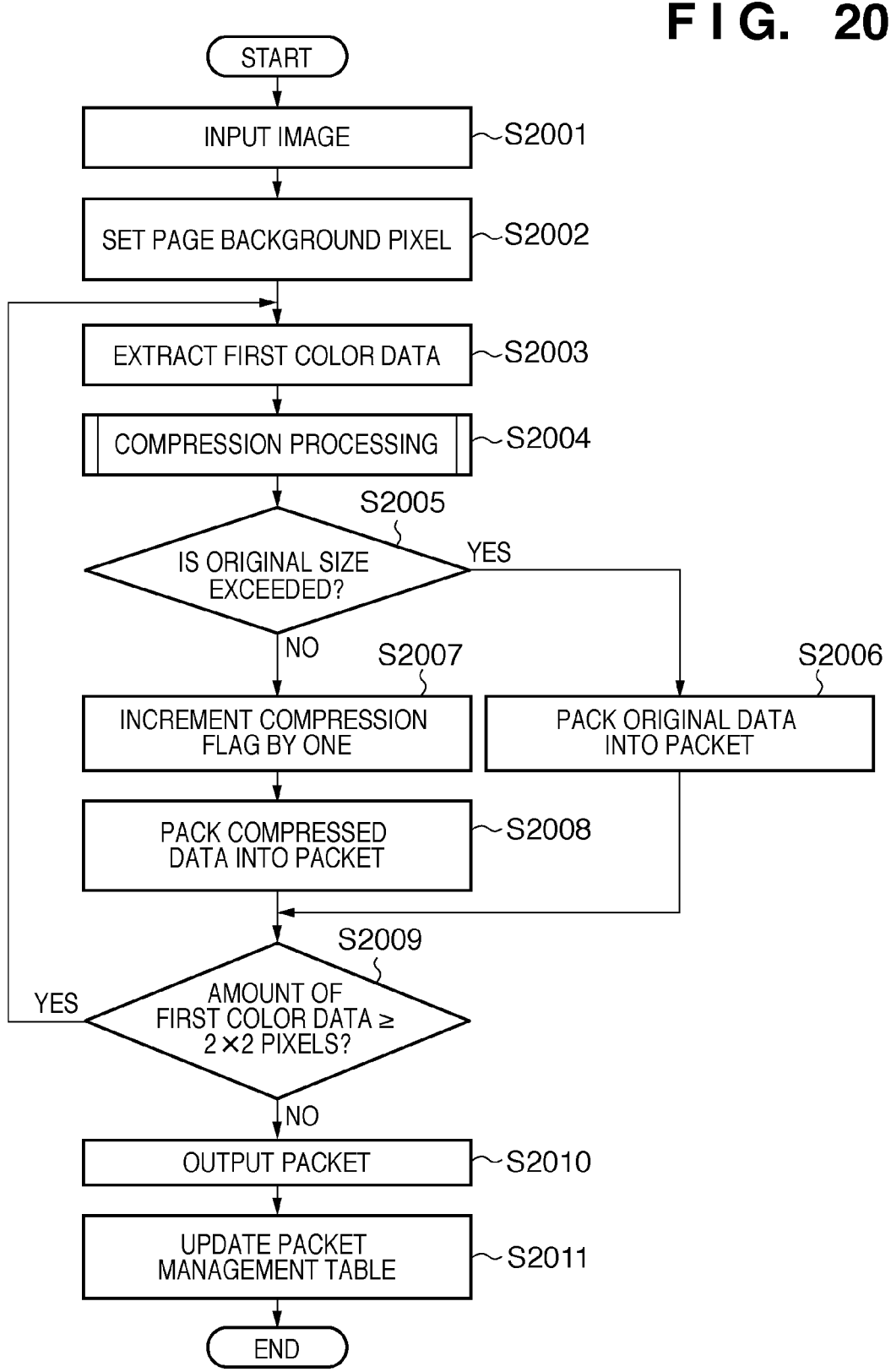
FIG. 20 is a flowchart showing multistage compression processing according to the third embodiment.

Multistage compression can also be performed for each tile. The sequence of this multistage compression for each packet will be described with reference to FIG. 20. First, tile data of 32×32 pixels is input (S2001). The background color is set (S2002), as described earlier. First color data is extracted from the packet (S2003). At this time, the initial first-stage compression is performed for all of 32×32 pixels. Compression processing (S2004) is performed for the first color image, as described earlier. The size of the compressed data is compared with that of the original data. If it is determined as a result of the comparison that the size of the compressed data exceeds that of the original data (YES in step S2005), the compression flag in the packet header remains the same, and raw data (the intact first color data in this case) is packed into a packet (S2006). The packet is output (S2010).

If it is determined that the size of the compressed data does not exceed that of the original data as a result of the compression (NO in step S2005), the compression flag in the packet header is incremented by one (S2007). This indicates that the compression stage level has advanced to a number indicated by this compression flag. After step S2007, the compressed data, that is, the first color, the pattern flag, and the second, third, and fourth color data are packed into a packet (S2008). At this time, the amounts of first color data and second, third, and fourth color data which are generated upon compression are described in the header for each stage level. If the amount of first color data is equal to or larger than 2×2 pixels (YES in step S2009), the process returns to step S2003, in which compression processing is performed for the first color data again. If the amount of first color data is smaller than 2×2 pixels (NO in step S2010), that is, if only one pixel remains as data to be processed, data to be compressed no longer remains, so the packet is output (S2010). The coordinate position and size of the packet are recorded in the packet management table (S2011), and the processing for each packet is completed.

Figure 21:
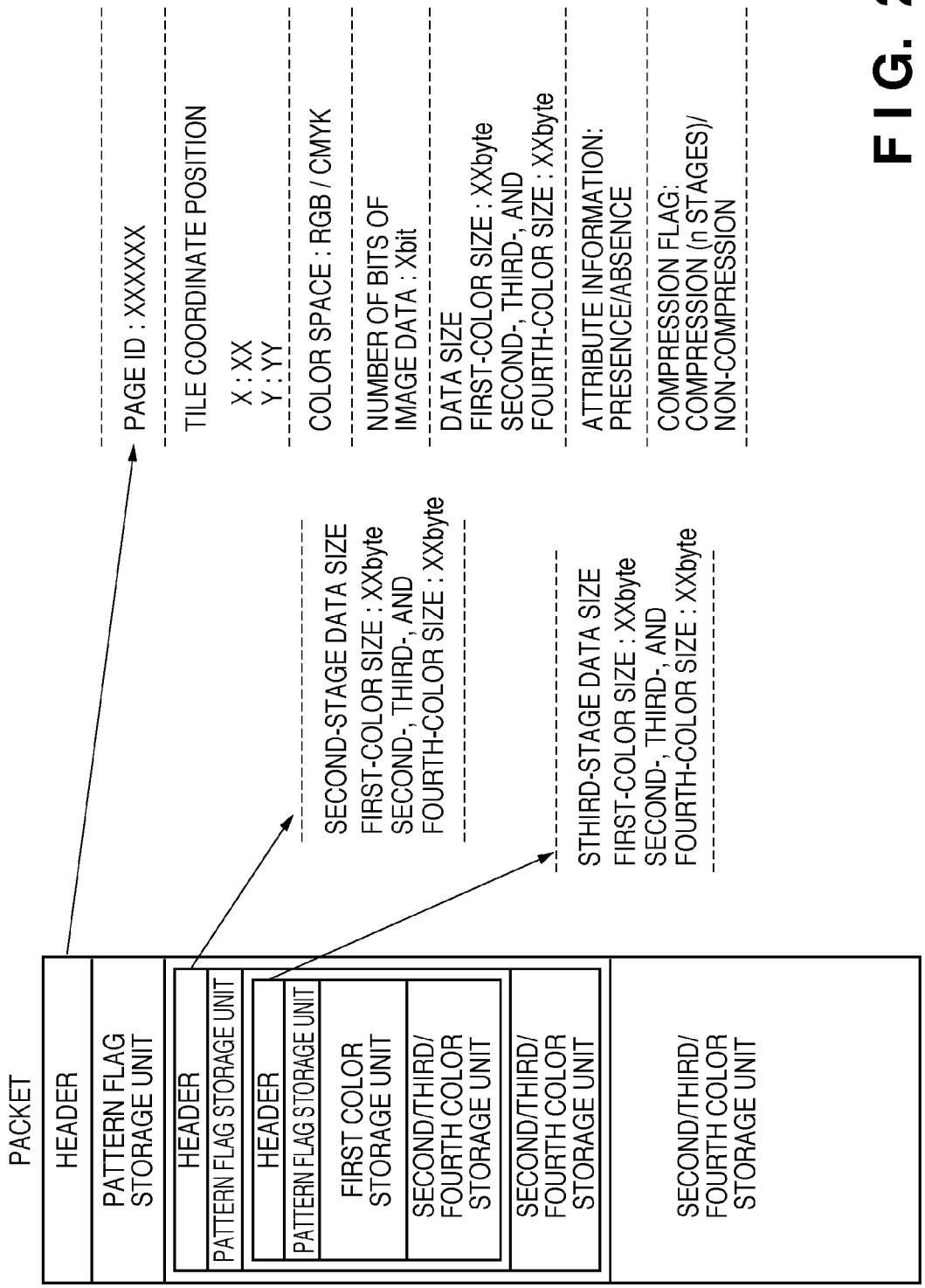
FIG. 21 is a view showing the structure of packed data obtained upon multistage compression processing.

When a tile of 32×32 pixels is used as an input, a loop of that compression is repeated a maximum of five times (32×32, 16×16, 8×8, 4×4, and 2×2). The packet has a data structure as shown in FIG. 21, in which the data is nested with respect to the first color storage unit.

Also, rasterization processing is performed using information described in each header because the header is assigned to each packet. First, if the compression flag indicates non-compression, data other than the header is output; otherwise, rasterization processing is performed. In the rasterization processing, the pattern flag storage position, the first color data storage position, and the second, third, and fourth color data storage position are obtained based on the header, and the data is sequentially rasterized into image data for each tile, as in the above-described embodiments.

For example, the position of the pattern flag can be obtained by offsetting because it is that of a header with a fixed length. If first color data has a tile size of 32×32 pixels, its pattern flag has a fixed size of 32×32 bits, so the first color data is obtained by multiplication by an offset from the pattern flag position. Lastly, because the first color data has an indeterminate length, second, third, and fourth color data are obtained by multiplication from an offset from the first color data position by referring to the first-color size described in the header.

If the first color data is further compressed, the next data size described in the header for each stage level is referred to, thereby reading out data while generating an offset corresponding to this size. Rasterization processing is performed in multiple stages.

According to the third embodiment, even in variable-length compression processing in which the size of compressed data of image data changes depending on the type of image data, an image can be partially extracted and processed for each tile with higher random access performance to the compressed data.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-089855, filed Apr. 8, 2010, which is hereby incorporated by reference herein in its entirety.

The invention claimed is:

1. An image processing apparatus comprising:
a first specification unit configured to divide first image data into blocks each with a size of 2×2 pixels, sequentially to determine the divided blocks as first processing objects, and to compare color data of respective pixels in the block which is the first processing object, thereby specifying a first pattern flag indicating a placement pattern of the color data included in the block;
a first extraction unit configured to extract, as first color data, color data corresponding to a pixel at a predefined position in the block with the size of 2×2 pixels, and, if the number of colors included in the block which is the first processing object is one of 2 to 4, further to extract second color data to fourth color data corresponding to the placement pattern defined in the specified, first pattern flag;
a first output unit configured to output the first pattern flag of each block specified by said first specification unit, the first color data in each block extracted by said first extraction unit, and the second color data to fourth color data in each block extracted by said first extraction unit;
a second color-reduction unit configured to divide second image data formed from the first color data output from said first output unit into blocks each with a size of 2×2 pixels, sequentially to determine the divided blocks as second processing objects, and to weight each pixel value based on the first pattern flag corresponding to each pixel that forms the block which is the second processing object, thereby performing color-reduction processing for the blocks which are the second processing objects;
a second specification unit configure to compare color data of respective pixels in the block which is the second processing object after the color-reduction processing is performed by said second color-reduction unit, thereby to specify a second pattern flag indicating a placement pattern of the color data included in the block which is the second processing object;
a second extraction unit configured to extract, as first color data, color data corresponding to a pixel at a predefined position in the block with the size of 2×2 pixels after the color-reduction processing is performed by said second color-reduction unit, and, if the number of colors included in the block which is the second processing object is one of 2 to 4, further to extract second color data to fourth color data corresponding to the placement pattern defined in the specified, second pattern flag; and
a second output unit configured to output the second pattern flag of each block specified by said second specification unit, the first color data in each block extracted by said second extraction unit, and the second color data to fourth color data in each block extracted by said second extraction unit.

2. The apparatus according to claim 1, wherein said second color-reduction unit calculates each pixel value after color-reduction by weighting the pixel value based on the first pattern flag corresponding to each pixel that forms the block which is the second processing object such that a higher weight is assigned to a pixel which influences a larger number of pixels in expanding each pixel that forms the block which is the second processing object, thereby performing color-reduction processing for the blocks which are the second processing objects.

3. The apparatus according to claim 1, further comprising:
a first color-reduction unit configured to divide the first image data into blocks each with a size of 2×2 pixels, sequentially to determine the divided blocks as first processing objects, and to perform color-reduction processing for the blocks which are the first processing objects,
wherein said first specification unit compares color data of respective pixels in the block which is the first processing object after the color-reduction processing is performed by said first color-reduction unit, thereby specifying a first pattern flag indicating a placement pattern of the color data included in the block.

4. The apparatus according to claim 1, further comprising a storage unit configured to store the first pattern flag and the second color data to fourth color data, which are output from said first output unit, and the second pattern flag, the first color data, and the second color data to fourth color data, which are output from said second output unit.

5. The apparatus according to claim 1, further comprising a storage unit configured to store color data of each pixel in a block which has become a processing object immediately before a block which is a current processing object, wherein if a difference between the color data of each pixel in the block which is the second processing object and the color data of each pixel stored in said storage unit is smaller than a predetermined threshold, said second specification unit outputs a pattern flag indicating that the block which is the second processing object is repetition of a block which has become a processing object immediately before the block which is the second processing object.

6. An image processing apparatus which performs compression processing for image data upon determining blocks each including a predetermined number of pixels as blocks of interest to be processed, comprising:
a color-reduction unit configured to perform color-reduction processing for the block of interest;
a specification unit configured to compare color data of respective pixels in the block of interest, thereby specifying a placement pattern of the color data included in the block of interest;
an extraction unit configured to extract, as first color data, color data corresponding to a pixel at a predefined position in the block, and further to extract color data other than the first color data included in the block;
an output unit configured to output the placement pattern specified by said specification unit, and the first color data and the color data other than the first color data, which are extracted by said extraction unit; and
a control unit configured to control to execute color-reduction processing by said color-reduction unit, for second image data formed from the first color data output from said output unit, upon determining blocks each including a predetermined number of pixels as blocks of interest to be processed, thereby further to control to re-execute, for the block of interest having undergone the color-reduction processing by said color-reduction unit, processing by specification unit, said extraction unit, and said output unit,
wherein in executing the color-reduction processing for the second image data formed from the first color data output from said output unit, upon determining blocks each including a predetermined number of pixels as blocks of interest to be processed, said color-reduction unit executes the color-reduction processing while weighting a pixel value of each pixel included in the block of interest to be processed, based on the placement pattern specified by said specification unit.

7. The apparatus according to claim 6, wherein said color-reduction unit further comprises setting unit configured to accept a threshold for use in determination as to whether color-reduction is to be performed by regarding the color data of respective pixels as having an identical color.

8. The apparatus according to claim 6, further comprising
a storage unit configured to store color data in a block which has become a processing object before the block of interest,
wherein if a difference between the color data in the block of interest and the color data stored in said storage unit is smaller than a predetermined threshold, said output unit outputs information indicating repetition of a block corresponding to the color data stored in said storage unit, in place of the color data in the block of interest.

9. The apparatus according to claim 6, wherein if attribute information indicating an attribute of the image data is assigned to each pixel in the block, said output unit adds and outputs the attribute information.

10. The apparatus according to claim 6, further comprising a division unit configured to divide the image data into tiles each including a plurality of blocks,
wherein the blocks included in each tile are sequentially determined as the blocks of interest and processed.

11. The apparatus according to claim 10, wherein the tile has a size of 32×32 pixels.

12. The apparatus according to claim 6, wherein the block has a size of 2×2 pixels.

13. The apparatus according to claim 1, wherein the first color data includes a value of a pixel positioned at an upper left end in the block.

14. An image processing method comprising:
a first specification step of using a first specification unit to divide first image data into blocks each with a size of 2×2 pixels, sequentially determine the divided blocks as first processing objects, and compare color data of respective pixels in the block which is the first processing object, thereby specifying a first pattern flag indicating a placement pattern of the color data included in the block;
a first extraction step of using a first extraction unit to extract, as first color data, color data corresponding to a pixel at a predefined position in the block with the size of 2×2 pixels, and, if the number of colors included in the block which is the first processing object is one of 2 to 4, further extract second color data to fourth color data corresponding to the placement pattern defined in the specified, first pattern flag;
a first output step of using a first output unit to output the first pattern flag of each block specified in the first specification step, the first color data in each block extracted in the first extraction step, and the second color data to fourth color data in each block extracted in the first extraction step;
a second color-reduction step of using a second color-reduction unit to divide second image data formed from the first color data output in the first output step into blocks each with a size of 2×2 pixels, sequentially determine the divided blocks as second processing objects, and weight each pixel value based on the first pattern flag corresponding to each pixel that forms the block which is the second processing object, thereby performing color-reduction processing for the blocks which are the second processing objects;
a second specification step of using a second specification unit to compare color data of respective pixels in the block which is the second processing object after the color-reduction processing is performed in the second color-reduction step, thereby specifying a second pattern flag indicating a placement pattern of the color data included in the block which is the second processing object;
a second extraction step of using a second extraction unit to extract, as first color data, color data corresponding to a pixel at a predefined position in the block with the size of 2×2 pixels after the color-reduction processing is performed in the second color-reduction step, and, if the number of colors included in the block which is the second processing object is one of 2 to 4, further extract second color data to fourth color data corresponding to the placement pattern defined in the specified, second pattern flag; and
a second output step of using a second output unit to output the second pattern flag of each block specified in the second specification step, the first color data in each block extracted in the second extraction step, and the second color data to fourth color data in each block extracted in the second extraction step.

15. An image processing method of performing compression processing for image data upon determining blocks each including a predetermined number of pixels as blocks of interest to be processed, characterized by comprising:
a color-reduction step of using a color-reduction unit to perform color-reduction processing for the block of interest;
a specification step of using a specification unit to compare color data of respective pixels in the block of interest, thereby specifying a placement pattern of the color data included in the block of interest;
an extraction step of using an extraction unit to extract, as first color data, color data corresponding to a pixel at a predefined position in the block, and further extract color data other than the first color data included in the block;
an output step of using an output unit to output the placement pattern specified in the specification step, and the first color data and the color data other than the first color data, which are extracted in the extraction step; and
a control step of using a control unit to control to execute color-reduction processing by said color-reduction unit, for second image data formed from the first color data output in the output step, upon determining blocks each including a predetermined number of pixels as blocks of interest to be processed, thereby further controlling to re-execute, for the block of interest having undergone the color-reduction processing in the color-reduction step, processing in the specification step, the extraction step, and the output step,
wherein in the color-reduction step, in executing the color-reduction processing for the second image data formed from the first color data output in the output step, upon determining blocks each including a predetermined number of pixels as blocks of interest to be processed, the color-reduction processing is executed while weighting a pixel value of each pixel included in the block of interest to be processed, based on the placement pattern specified in the specification step.

16. A non-transitory computer-readable medium storing a program for causing a computer to function as each unit of an image processing apparatus defined in claim 1.

* * * * *